United States Patent [19]
Doi et al.

[11] Patent Number: 6,076,598
[45] Date of Patent: Jun. 20, 2000

[54] OPPOSED FLOW HEAT EXCHANGER

[75] Inventors: Akira Doi; Kunihiko Kaga; Hiroyuki Akita; Hidemoto Arai; Youichi Sugiyama, all of Tokyo, Japan

[73] Assignee: Mitsubishi Denki Kabushiki Kaisha, Tokyo, Japan

[21] Appl. No.: 08/922,366

[22] Filed: Sep. 3, 1997

[30] Foreign Application Priority Data

Sep. 10, 1996 [JP] Japan .................................... 8-239330
Jan. 21, 1997 [JP] Japan .................................... 9-008830

[51] Int. Cl.[7] .................................................. F28D 9/00
[52] U.S. Cl. .................................. 165/166; 165/DIG. 393; 165/905
[58] Field of Search .......................... 165/166, DIG. 393, 165/905, 167

[56] References Cited

U.S. PATENT DOCUMENTS

| | | | |
|---|---|---|---|
| 2,812,165 | 11/1957 | Hammond | 165/166 |
| 3,165,152 | 1/1965 | Jones | 165/166 |
| 3,198,248 | 8/1965 | Stack | 165/166 |
| 3,666,007 | 5/1972 | Yoshino et al. | 165/166 |
| 5,029,639 | 7/1991 | Finnemore et al. | 165/166 |

FOREIGN PATENT DOCUMENTS

| | | |
|---|---|---|
| 57-120875 | 1/1956 | Japan . |
| 57-122289 | 7/1982 | Japan . |
| 59-24195 | 2/1984 | Japan . |
| 62-112990 | 5/1987 | Japan . |
| 740380 | 11/1955 | United Kingdom . |
| 1205933 | 9/1970 | United Kingdom . |
| 2171507 | 8/1986 | United Kingdom . |

*Primary Examiner*—Allen Flanigan

[57] ABSTRACT

An opposed flow heat exchanger comprising partitions including a corrugated portion for forming passages in a wavefront direction, and flat portions for taking in or out air flows from a predetermined direction at opposite ends of the corrugated portion in the wavefront direction; and flat shape holding plates having a length in a direction of the passages which is not longer than a length of the partitions; wherein the partitions and the shape holding plates are alternately layered so that the corrugated portion of each of the partitions and the shape holding plates contact together, and the flat portion of each of the partitions faces to the flat portion of a partition adjacent thereto, thereby independently forming the passages through the partitions.

4 Claims, 21 Drawing Sheets

OPPOSED FLOW HEAT EXCHANGER

BACKGROUND OF THE INVENTION

1. Field of the Invention

The present invention relates to a heat exchanger which is used in a heat exchanger type ventilating device or an air conditioning unit.

2. Discussion of Background

Working or living spaces in, e.g., office buildings, apartments and townhouses are air-conditioned in a wide range, increasing energy consumption for air conditioning. A total heat exchanger which exchanges heat between indoor air and outdoor air can save energy for an air conditioning unit by recovering heat lost in ventilation. A heat exchanger having high heat exchanger effectiveness is required in terms of recovery of heat. It has been widely known that conventional shapes of a heat exchanger are classified into a crossflow total heat exchanger wherein supply air flows perpendicularly to exhaust air, and an opposed flow total heat exchanger wherein supply air and exhaust air flow in opposite directions. An opposed flow total heat exchanger can generally has a higher heat exchanger effectiveness than a crossflow total heat exchanger having the same area of heat transfer surface.

Improvement in performance and miniaturization of total heat exchangers by flowing supply air and exhaust air in opposite directions have been disclosed in, e.g., JP-A-57122289. In FIG. 22, there is shown a perspective view of a schematic structure of the total heat exchanger disclosed in the publication. In this figure, reference numeral 1 designates an opposed flow total heat exchanger, reference numeral 2 designates partitions which have a corrugated central portion, reference numeral 3 designates the corrugated portion of the partitions 2, reference numeral 4 designates uncorrugated flat portions which are formed on opposite ends of the partitions 2, reference numeral 5 designates closed end surfaces which are arranged at the opposite ends of the partitions 2, and reference numeral 6 designates closed side surfaces which are arranged at sides of passages formed by the partitions 2.

Total heat exchange of sensible heat and latent heat is carried out for heat recovery by flowing exhaust air from indoors to a direction indicated by an arrow 7 and flowing supply air from outdoors in a direction indicated by an arrow 8. The supply air and the exhaust air form a passage arrangement in an opposed flow pattern through the partitions 2 to carry out heat exchange effectively. The corrugated portion 3 has a length L4 in a flowing direction longer than a width L5 of the partitions 2.

In FIG. 23, there is shown a cross-sectional view of the total heat exchanger 1 of FIG. 22 taken along the line XXIII—XXIII. The corrugated portion has corrugations and intermediate flat portions alternately formed thereon. When the partitions are put on above one another, the intermediate flat portions are put on the corrugations, and the corrugations are put on the intermediate flat portions to hold required spacing. The respective passages formed by the partitions have an upper portion formed with a corrugation and a lower portion formed with an intermediate flat portion, and have the exhaust air 7 and the supply air 8 flowing in a layered pattern. The spacing G1 between adjacent partitions 2 corresponds to the spacing between adjacent intermediate flat portions at the corrugated portion 3, and the spacing between adjacent flat portions 4 without corrugations is also the same as the spacing between adjacent intermediate flat portions.

Another measure has been disclosed in e.g. JP-A-5924195. In FIG. 24, there is shown a schematic view of the structure of the total heat exchanger disclosed in this publication. In FIG. 24, like or corresponding parts are indicated by the same reference numerals as those parts of FIG. 22, and explanation of such parts will be omitted. Reference numeral 26 designates flat plates, reference numeral 27 designates openings "A", and reference numeral 28 designates openings "B". The flat plates are jointed to corrugated portions 3, and extend longer than the corrugated portions 3 to form the openings "A" 27 with flat portions 4 without corrugations. Units which are formed by jointing the partitions 2 to the flat plates 26 are put one above another to form the total heat exchanger 1. Each of the openings "B" 28 is formed between the flat portion 4 and the flat plate 26 of adjacent jointed units.

The respective openings "A" 27 have spacing G2, and the openings "B" 28 have spacing G3. Heat exchange is carried out by flowing e.g supply air in the openings "A" 27 and exhaust air in the openings "B" 28.

As seen from FIG. 24, the length L7 of the flat plates 26 is longer than the length L6 of the corrugated portions 3 of the partitions 2 because the total heat exchanger 1 separates the supply air and the exhaust air using the partitions 2 and the flat plates 26.

Although the spacing of the openings "A" 27 and that of the openings "B" 28 are not required to be equal, two different fan requirements are needed when pressure loss is different on a supply air side and an exhaust air side. For this reason, the respective flat plates 26 are positioned at a central portion between the flat portion 4 of a partition 2 and the flat portion 4 of its adjacent partition because it is desired to make the spacing G2 and the spacing G3 as equal as possible.

In FIG. 25, there is shown a sectional view of the total heat exchanger 1 of FIG. 24 taken along the line XXV—XXV. The corrugated portions 3 are jointed to the flat plates 26 to form passages. The passages have exhaust air 7 and supply air 8 alternately flowing therein. Although the flat portions 4 of the partitions 2 do not exist in the XXV—XXV section, the flat portions are positioned in a substantially central portion of the corrugated portions 3 as shown by broken lines.

The spacing G2 of the openings "AA" 27 and the spacing G3 of the openings "B" 28 are substantially half of the peak to peak length of a wave which may be considered the amplitude of the corrugated portions 3. Different air flows flow on upper side and a low side of the flat plates 26 to carry out heat exchange through the flat plates 26.

Since the total heat exchanger shown in FIG. 22 has been constructed as stated earlier, two main problems are created. Firstly, it is required that the corrugated portions 3 of the partitions 2 be formed so as to include the corrugations and the intermediate flat portions therebetween alternately, that the corrugations are put on the flat portions at some locations, and that the flat portions are put on the corrugations at the other locations. Otherwise, the spacing G1 of the partitions 2 can not be held. This means that the corrugated portions require high manufacturing accuracy, and that paper or other material which is likely to change its shape depending on temperature or humidity is not suitable for a material of the partitions 2.

Secondly, since the spacing G1 of the partitions 2 is not only the spacing of the corrugated portions 3 but also that of the flat portions 4 without corrugations as shown in FIG. 23, fluid loss becomes great at the flat portions 4, introducing an increase in pressure loss of the heat exchanger. Although the opposed flow exchanger can improve heat transfer property due to opposed flows to make the corrugated portions 3 for heat exchange smaller and the shape more flexible in comparison with the crossflow heat exchanger, the opposed flow heat exchanger have a problem in that pressure loss at the flat portions where air flows are separated is great.

The other conventional heat exchanger shown in FIG. 24 also has the second problems. Because the spacing of the openings "A" 27 and the openings "B" 28 formed between the respective flat portions 4 and the flat plates 26 is substantially half the amplitude of the corrugated portions 3, the pressure loss at portions adjacent the openings to the corrugated portions 3 is greater than the pressure loss at the corrugated portions 3.

As a measure to decrease pressure loss in the entire heat exchanger 1 constructed as stated earlier, it could be considered that the pressure loss in the entirety is decreased by reducing the pressure loss at the flat portions 4 without corrugations because the pressure loss at the flat portions 4 is greater than the pressure loss within the corrugated portions 3. As one of such a measure, it could be considered that the spacing between the flat portions 4 and the flat plates 26 is increased to decrease the flow rate of the air flows so as to reduce the pressure loss. In this case, a decrease in the flow rate at the corrugated portions 3 lowers a heat transfer property because not only the spacing at the flat portions 4 but also the spacing at the corrugated portions 3 for heat exchange becomes large. This means that a larger heat exchange area is required to obtain the same heat exchanger effectiveness, which leads to enlargement of the heat exchanger.

It is an object of the present invention to eliminate these problems, and to provide an opposed flow heat exchanger capable of holding a shape on assemblage in a sufficient manner, minimizing pressure loss and making the size compact.

SUMMARY OF THE INVENTION

According to a first aspect of the present invention, there is provided an opposed flow heat exchanger comprising partitions including a corrugated portion for forming passages arranged in a wavefront direction, and flat portions for taking in or out air flows from a predetermined direction at opposite ends of the corrugated portion in the wavefront direction; and flat shape holding plates having a length in a direction of the passages which is not longer than a length of the partitions; wherein the partitions and the shape holding plates are alternately layered so that the corrugated portion of each of the partitions and the shape holding plates contact together, and the flat portion of each of the partitions faces to the flat portion of a partition adjacent thereto, thereby independently forming the passages through the partitions.

The term "wavefront direction" means a direction of the ridge of a wave of the corrugated portion.

According to a second aspect of the present invention, the shape holding plates are arranged so that the shape holding plates are located in a projection plane of the corrugated portion in the direction of the passages.

According to a third aspect of the present invention, opposite ends of the shape holding plates are retracted in comparison with the opposite ends of the corrugated portion in the direction of the passages.

According to a fourth aspect of the present invention, the shape holding plates or the partitions are made of paper including pulp.

According to a fifth aspect of the present invention, a distance between a peak of the corrugated portion of the partitions and the flat portions thereof in a layering direction is substantially half a peak to peak distance as an amplitude of a wave of the corrugated portion.

According to a sixth aspect of the present invention, the shape holding plates have a length in the direction of the passages which is shorter than a length of the corrugated portion in the wavefront direction.

According to a seventh aspect of the present invention, the corrugated portion has the opposite ends in the wavefront direction tapered.

According to an eighth aspect of the present invention, the shape holding plates have concavities and convexities formed thereon.

According to a ninth aspect of the present invention, the shape holding plates have a surface formed with raised pieces.

According to a tenth aspect of the present invention, the shape holding plates are made from a sheet partially or wholly made of aluminum laminated paper.

According to an eleventh aspect of the present invention, the sheet partially or wholly made of aluminum laminated paper has slits formed thereon in a direction perpendicular to the direction of the passages.

According to a twelfth aspect of the present invention, end openings are arranged on end surfaces of the flat portions in the wavefront direction for taking in and out the air flows.

According to a thirteenth aspect of the present invention, the flat portions have a spacer arranged thereon between the end openings and each of the corrugated portions so as to gradually change an air flow area.

According to a fourteenth aspect of the present invention, the flat portions have edges formed with opening edges for taking in or out the air flows and closed edges for separating the air flows from an external space, and the closed edges extend at an angle within a range of not less than 110° to not larger than 130° with respect to the direction of the passages in the corrugated portions.

According to a fifteenth aspect of the present invention, the partitions have a plurality of the flat portions formed thereon at one of the opposite ends in the wavefront direction.

According to a sixteenth aspect of the present invention, the opening ends of adjacent flat portions are arranged so as to face each other.

According to a seventeenth aspect of the present invention, the flat portions have flow dividing plates formed thereon in substantially parallel to the closed edge near thereto.

According to an eighteenth aspect of the present invention, a product of a thickness of the flow dividing plates by a number of the flow dividing plates is set not greater than ⅒ of an opening width of the flat portions.

According to a nineteenth aspect of the present invention, the flow dividing plates are arranged at intervals which are not less than 5 times intervals of the flat portions in a layered direction.

According to a twentieth aspect of the present invention, a flat portion in a first layer at one end of the exchanger in the wavefront direction has an end surface formed with a first end opening as an inlet or outlet for one of air flows, a flat portion in a second layer adjacent the first layer at the one end has an end surface formed with a second end opening as an outlet or inlet for the other air flow so as to be out of alignment of the first end opening, a flat portion in the first layer at the other end in the wavefront direction has an end surface formed with a third end opening as an outlet or inlet for the one air flow, and a flat portion in the second layer at the other end in the wavefront direction has an end surface formed with a fourth end opening as an inlet or outlet for the other air flow so as to be out of alignment of the third end opening.

In accordance with the first aspect of the present invention, there are offered advantages in that shape holding after layering is good, that pressure loss is small and that the heat exchanger can be compact.

According to the second aspect of the present invention, there are offered advantages in that pressure loss at the flat portions can be minimized, and that heat exchange effectiveness at the corrugated portion can be improved.

In accordance with the third aspect of the present invention, there is offered an advantage in that pressure loss at a boundary between each of the flat portions and the corrugated portion can be minimized to make fouling of dust and dirt difficult, there by providing improved maintenance.

In accordance with the fourth aspect of the present invention, there is offered an advantage in that contacting the shape holding plates and the corrugated portion forms a truss structure to provide such strength that the contacted portions are unlikely to be broken by expansion or contraction due to a change in humidity.

In accordance with the aspect of the present invention, there is provided an advantage in that the flow rates of air flows on upper and lower sides of each of the shape holding plates can be substantially equalized to improve heat exchange effectiveness.

In accordance with the sixth aspect of the present invention, there is offered an advantage in that the passages can have a short length to minimize pressure loss in comparison with a heat exchanger having the same area of heat transfer surface.

In accordance with the seventh aspect of the present invention, there is offered an advantage in that pressure loss can be minimized.

In accordance with the eighth aspect of the present invention, there is offered an advantage in that a boundary layer on the shape holding plates can be easily renewed in the direction of the passages to improve a heat transfer property.

In accordance with the ninth aspect of the present invention as well, there is offered an advantage in that a boundary layer on the shape holding plates can be easily renewed in the direction of the passages to improve a heat transfer property.

In accordance with the tenth aspect of the present invention, there is offered an advantage in that the shape holding plates can have fin effectiveness improved to raise heat exchanger effectiveness.

In accordance with the eleventh aspect of the present invention, there is offered an advantage in that an accelerating direction of heat transfer can be restricted to improve heat exchanger effectiveness.

In accordance with the twelfth aspect of the invention, there is offered an advantage in that the creation of a sharp bend of air flows can be restrained to minimize pressure loss.

In accordance with the thirteenth aspect of the invention, there is offered an advantage in that sharp enlargement and sharp reduction of the passages between the end openings and the corrugated portion can be prevented to minimize pressure loss.

In accordance with the fourteenth aspect of the invention, there is offered an advantage in that the heat exchanger can be made compact and have pressure loss minimized because the size reduction can be established without increasing pressure loss when air flows are taken in and out between the flat portions and the corrugated portion.

In accordance with the fifteenth aspect of the invention, there is offered an advantage in that the heat exchanger can be made compact and have pressure loss minimized because pressure loss at the flat portions are reduced with the flat portions having a smaller area.

In accordance with the sixteenth aspect of the invention, there is offered an advantage in that the same air flow can be flowed in the opposite flat portions to make the structure of an air path simple.

In accordance with the seventeenth aspect of the invention, there is offered an advantage in that drifting of the air flow can be restrained to minimize pressure loss.

In accordance with the eighteenth aspect of the invention, there is offered an advantage in that the cross-sectional area of the passages at the flat portions can be ensured in a sufficient manner to minimize pressure loss.

In accordance with the nineteenth aspect of the invention, there is offered an advantage in that the divided passages can be ensured to have a sufficient width to minimize pressure loss.

In accordance with the twentieth aspect of the invention, there is offered an advantage in that the opening area of the end openings can be ensured at a large amount to prevent the passages at the flat portions between the end openings and the corrugated portion from being sharply enlarged or sharply reduced, thereby minimizing pressure loss.

BRIEF DESCRIPTION OF THE DRAWINGS

FIG. 13A is a schematic plan view showing a modified partition according to the eighth embodiment;

FIG. 13B is a schematic plan view showing another modified partition according to the eighth embodiment;

DESCRIPTION OF THE PREFERRED EMBODIMENTS

Embodiments according to the present invention will be described with reference to the accompanying drawings.
Embodiment 1

Figure 1:
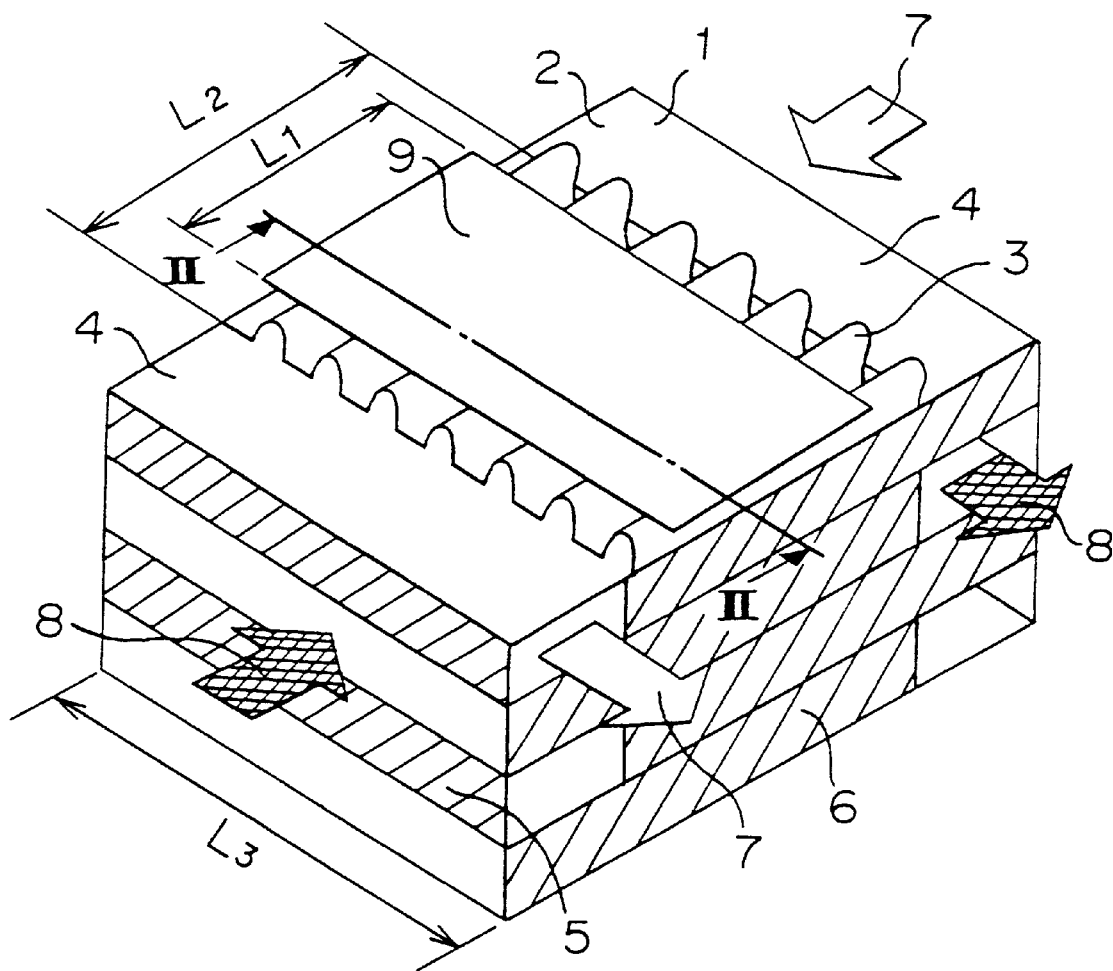
FIG. 1 is a schematic perspective view showing the opposed flow total heat exchanger according to a first embodiment of the present invention.

In FIG. 1, there is shown a schematic perspective view of the opposed flow total heat exchanger according to an embodiment of the present invention. In this Figure, like or corresponding parts are indicated by the same reference numerals as the parts of the conventional heat exchangers, and explanation of those parts will be omitted. In this Figure, reference numeral 9 designates a shape holding plate which is formed in a flat shape and which is jointed to a corrugated portion 3 of a partition 2. When a plurality of shape holding plates 9 and a plurality of partitions 2 are layered one above another, the respective shape holding plates 9 are interposed between adjoining corrugated portions 3. As a result, the corrugated portion 3 which adjoin in a layering direction are not directly jointed together, and it is possible to manufacture the heat exchanger with spacing between adjoining partitions 2 kept constant even if the manufacturing accuracy for the corrugated portions 3 is not so high.

Passages are formed in the wavefront direction of the corrugated portions 3. When the shape holding plates 9 to be jointed to the corrugated portions 3 have a length of L1 in a direction of the passages, and when the corrugated portions 3 have a length of L2 in the same direction, L1 is set to be shorter than L2 (L1<L2) so that the shape holding plates 9 are located within the corrugated portions 3 in the direction of the passages.

Figure 2:
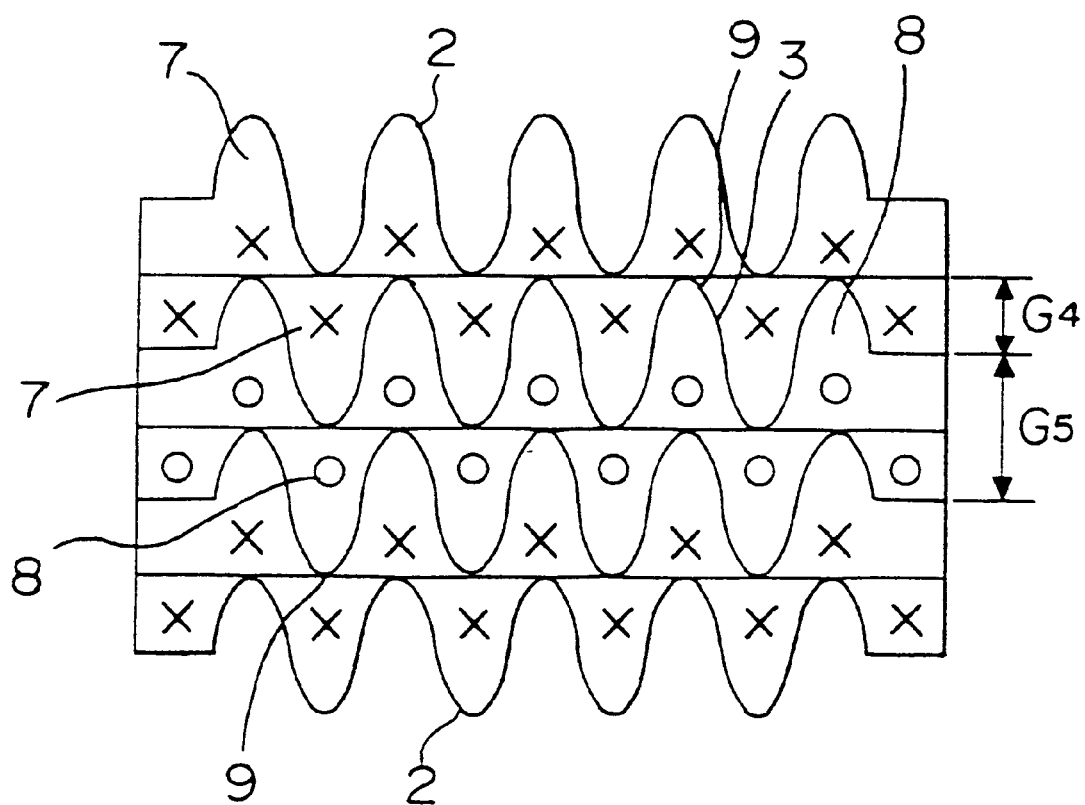
FIG. 2 is a sectional view taken along the line II—II of FIG. 1.

In FIG. 2, there is shown a sectional view of the total heat exchanger 1 of FIG. 1 taken along the line II—II.

As seen from this Figure, exhaust air 7 and supply air 8 carry out heat exchange through the waves of the corrugated portions 3 though exhaust air and supply air do not carry out through the shape holding plate 9. This is because only one of the exhaust air and the supply air is flowing on both upper and lower sides of each of the shape holding plates 9.

When the shape holding plate 9 are not interposed between flat portions 4 of the partitions, and when only one of the exhaust air and the supply air is flowing on both upper and lower sides of each of the shape holding plates 9, the spacing in the passages at the corrugated portions 3 in the layering direction is G4 as shown in FIG. 2, while the spacing in the passages at the flat portions is G5 which is substantially twice G4. Such arrangement can minimize pressure loss at the flat portions 4 to reduce pressure loss in the entire heat exchanger 1.

In addition, the shape holding plates 9 are jointed to the corrugated portions 3, the shape holding plates work as fins for the partitions 2, contributing to heat exchange.

If L1 is set to be slightly longer than L2 so that the spacing G5 of the passages in the layering direction is substantially twice the spacing G4 of the corrugated portions 3 at some portions of the flat portions 4, a reduction in pressure loss at the flat portions 4 with respect to an incoming or outgoing air flow can be established to some extent.

If L1 is set to be equal to L2 so that the shape holding plates 9 are matched with the corrugated portions 3 in the direction of the passages, the flow rate is lowered at the shape holding portions 3 to provide good heat exchanger effectiveness as well as to reduce the pressure loss at the flat portions 4.

However, when the difference between the length of the shape holding plates 9 in the direction of the passage and the length of the corrugated portions 3 in the direction of the passages is small, pressure loss is actually increased at a place where an air flow is divided into sections on the upper and lower sides of the shape holding plates 9. When L1 is set to be shorter than L2 as shown in FIG. 1 so as to provide some amount of difference, an increase in pressure loss due to the division of the air flow can be eliminated. Although there is no limitation on the difference between L1 and L2, an increase in pressure loss is minimized if the difference is as much as the spacing G5 of the corrugated portions 3 as the passages at the opposite ends of the shape holding plate in the direction of the passages.

The presence of such difference can not only decrease pressure loss but also make fouling of dust and dirt difficult, contributing to improvement in maintenance. There is no limitation on the material of the shape holding plates 9. The shape holding plate may be made of e.g. pulp as a main raw material or a film using an organic material, or may be a metallic sheet or metallic foil. When the partitions 2 are made of paper, the shape holding plates 9 in a flat shape are jointed to the corrugated portions 3 in accordance with the present invention, providing a truss structure. Such arrangement can provide in a peculiarly effective manner the heat exchanger with such strength that prevents leakage from occurring due to breakage at jointed portions even if the partitions 2 or the shape holding plates 9 are expanded or contracted by humidity in the air flows.

As seen from FIG. 1, the length L2 of the corrugated portions 3 in the direction of the passages is shorter than the width L3 of the partitions 2. By this arrangement, the proportion of the pressure loss at the corrugated portions 3 to the pressure loss in the entire heat exchanger 1 is increased by reducing the pressure loss at the flat portions 4 as headers for separating a primary air flow and a secondary air flow, and further the entire pressure loss can be decreased by reducing the pressure loss at the corrugated portions 3. When the area of the heat transfer surface is kept the same, the shorter the length of the passages is, the smaller the pressure loss at the corrugated portions 3 becomes, and the larger the cross-sectional area of the passages becomes, the smaller the pressure loss at the corrugated portions 3 becomes. In order to minimize the pressure loss in the heat exchanger 1, it is recommendable to make the length L2 of the passages shorter the width L3 of the partitions 2. Such arrangement can provide a heat exchanger with pressure loss minimized and with performance kept at the same level.

Figure 3:
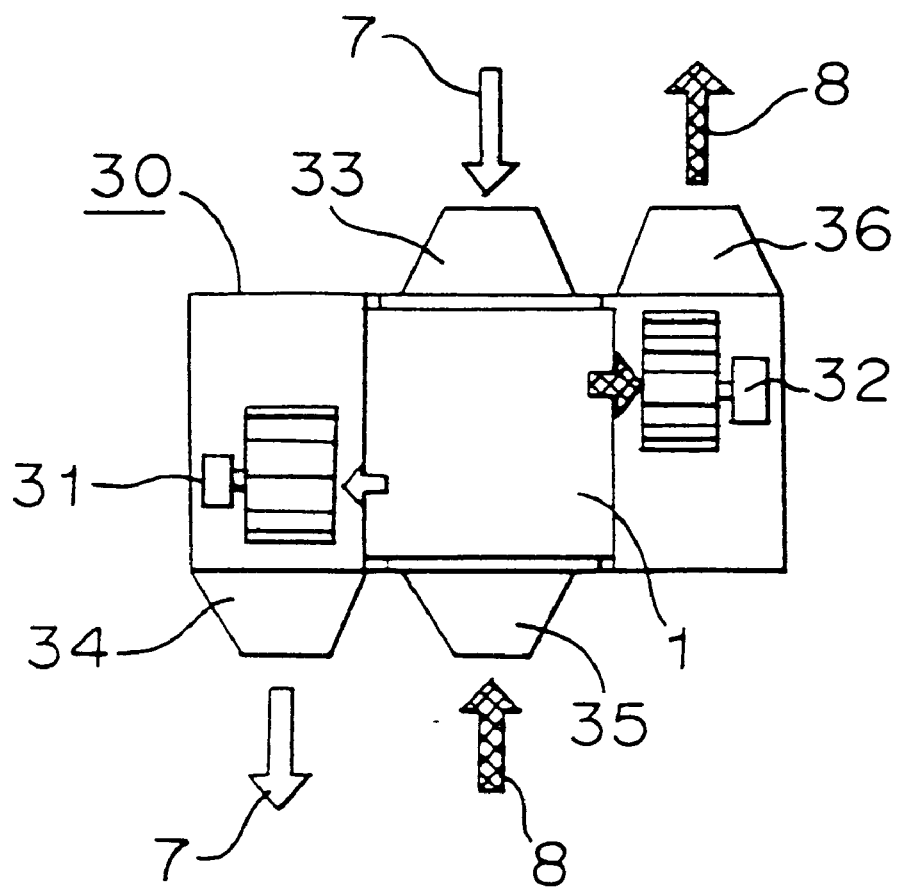
FIG. 3 is a schematic sectional view showing a sealing mounted and concealed type total heat exchanging device with the total heat exchanger of FIG. 1 incorporated therein.

In FIG. 3, there is shown a sectional view of a ceiling mounted and concealed total heat exchanger type ventilating device with the opposed flow total heat exchanger 1 shown in FIG. 1 incorporated thereinto. In this Figure, reference numeral 30 designates the main body of the sealed mounted and concealed total heat exchanger type ventilating device, reference numeral 1 designates the opposed flow total heat exchanger shown in FIG. 1 which is incorporated into a central portion of the main body 30, reference numeral 31 designates an air discharging fan which has an inlet communicated with an outlet for the exhaust air 7 in the opposed flow total heat exchanger 1 and which is constituted by a centrifugal fan, and reference numeral 32 designates an air supplying fan which has an inlet communicated with an outlet for the supply air 8 in the opposed flow total heat exchanger 1 and which is constituted by a centrifugal fan.

Reference numeral 33 designates an exhaust air inlet which is connected to indoor and which communicates with an exhaust air inlet of the total heat exchanger 1, reference numeral 34 designates an exhaust air outlet which is connected to outdoor and which communicates with an outlet of the air discharging fan 31, reference numeral 35 designates a supply air inlet which is connected to outdoor and which communicates with a supply air inlet of the total heat exchanger 1, and reference numeral 36 designates a supply air outlet which is connected to indoor and which communicates with an outlet of the air supplying fan 32. The exhaust air inlet 33, the exhaust air outlet 34, the supply air inlet 35 and the supply air outlet 36 are connected to ducts or other members to communicate with indoor and outdoor by duct piping like the conventional ceiling mounted and concealed total heat exchanging device though such connection is not shown in the accompanying drawings.

In the total heat exchanging device 30 and the opposed flow total heat exchanger 1 constructed as stated earlier, the supply air 8 enters the total heat exchanger 1 from outdoor through the supply air inlet 35, the supplied air flows out of the total heat exchanger 1, and the supply air is supplied indoor from the supply air outlet 36 by the air supplying fan 32. On the other hand, the exhaust air 7 enters the total heat exchanger 1 from indoor through the exhaust air inlet 33, the exhaust air flows out of the total heat exchanger 1, and the exhaust air is exhausted outdoor from the exhaust air outlet 34 by the air discharging fan 31. The supply air 8 and the exhaust air 7 flow in opposed directions and carry out heat exchange through the partitions 2 while both air flows are passing through the total heat exchanger 1 as seen from the structure of the total heat exchanger 1 shown in FIGS. 1 and 2.

Embodiment 2

Figure 4:
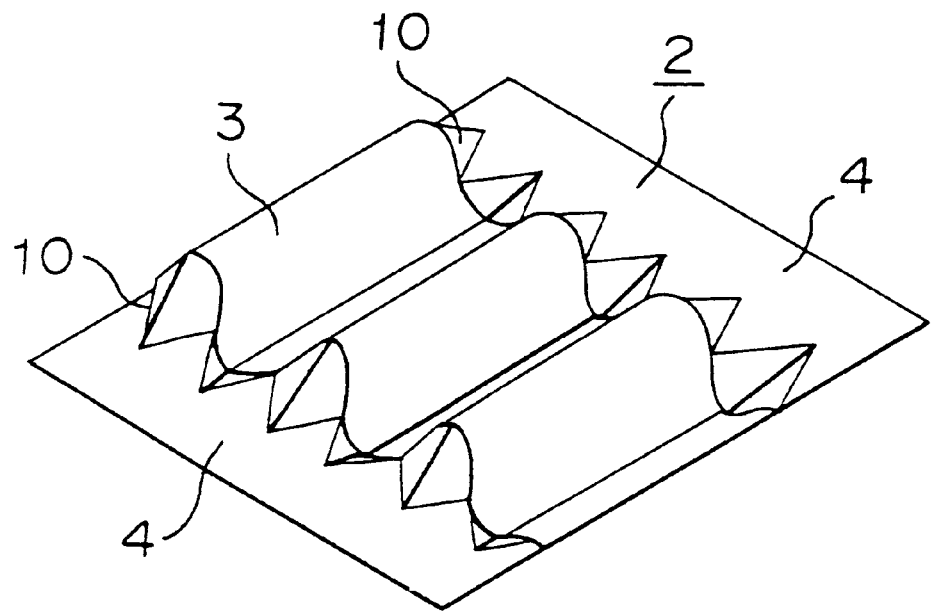
FIG. 4 is a schematic perspective view showing a partition of the opposed flow total heat exchanger according to a second embodiment of the present invention.

In FIG. 4, there is shown a schematic perspective view of a partition of the opposed flow total heat exchanger according to another embodiment of the present invention, wherein another shape of the partition 2 shown in FIG. 1 is shown. In this Figure, like or corresponding parts are indicated by the same reference numerals as the parts of the first embodiment, and explanation on those parts will be omitted. Reference numeral 10 designates a tapered portion which is shaped at a boundary between each of corrugated portions 3 and each of flat portions 4. The shape of the partition 2 is the same as the partition shown in FIG. 1 except for the presence of such a tapered portion. The presence of such a tapered portion 10 can further reduce pressure loss in the passages to lower the pressure loss in the entire heat exchanger 1.

Figure 5:
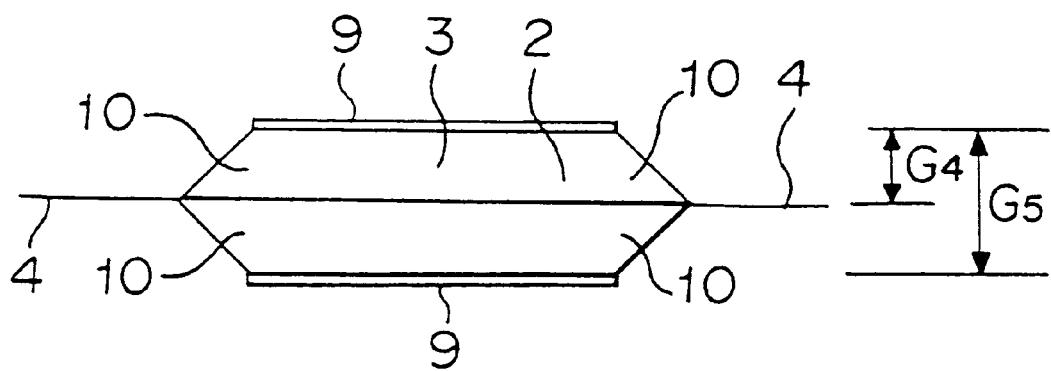
FIG. 5 is a sectional view of the partition shown in FIG. 4.

In FIG. 5, there is shown a sectional view of the partition 2 shown in the perspective view of FIG. 4. There are the flat portions 4 at opposed ends of a corrugated portion 3. When the spacing between the flat portions 4 and the peak of the corrugated portion 3 is defined as G4, and when the peak to peak spacing of the corrugated portion 3 as the amplitude of a wave is defined as G5, G5 is substantially twice G4. By such arrangement, the cross-sectional area defined by a shape holding plate 9 and the partition 2 above the partition 2 is substantially equal to the cross-sectional area defined by an adjoining shape holding plate and the partition 2 below the partition 2 to provide an equal distribution of flow rate, improving heat exchanger effectiveness. The second embodiment is the same as the first embodiment in terms of other advantages.

Embodiment 3

Figure 6:
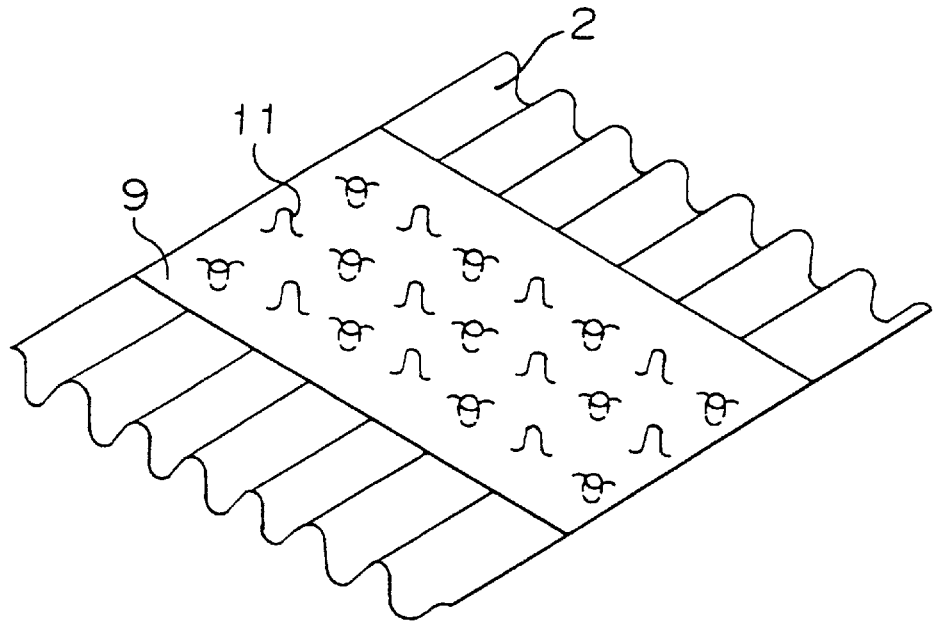
FIG. 6 is a schematic perspective view showing a shape holding plate of the opposed flow total heat exchanger according to a third embodiment of the present invention.

In FIG. 6, there is shown a schematic perspective view of a corrugated portion and a shape holding plate of the opposed flow total heat exchanger according to another embodiment of the present invention, wherein another shape of the partition 2 shown in FIG. 1 is shown. In this Figure, like or corresponding parts are indicated by the same reference numerals as the parts of the first embodiment, and explanation of those parts will be omitted. Reference numeral 11 designates concavities and convexities which are formed on the shape holding plate 9 so as to project from both sides of the plate in a substantially uniform manner. Boundary layers formed by air flows above and below the shape holding plate 9 can be renewed in a flowing direction by the concavities and the convexities 11 to raise a heat transfer rate, improving a heat transfer property. The second embodiment is the same as the first embodiment in terms of other entire structure and advantages.

Embodiment 4

Figure 7:
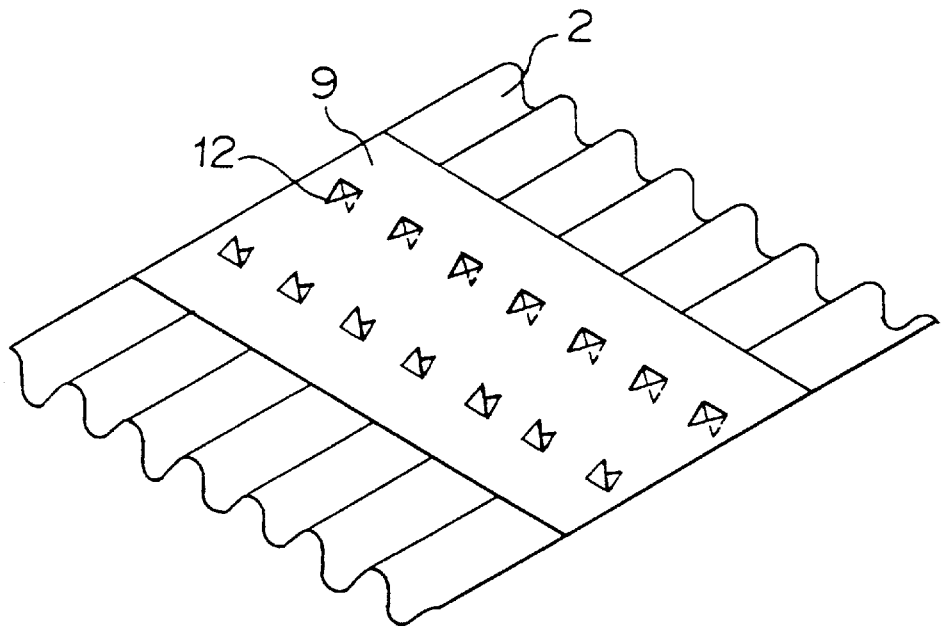
FIG. 7 is a schematic perspective view showing a shape holding plate of the opposed flow total heat exchanger according to a fourth embodiment of the present invention.

In FIG. 7, there is shown a perspective view of a shape holding plate of the heat exchanger according to another embodiment of the present invention, which is different from the embodiment shown in FIG. 6. In FIG. 7, like or corresponding parts are indicated by the same reference numerals as the parts of the first embodiment, and explanation of those parts will be omitted. Reference numeral 12 designates raised pieces which are formed on the shape holding plate 9 in a substantially uniform manner so as to project from both sides of the shape holding plate, and which are formed by slit forming. Boundary layers formed by air flows above and below the shape holding plate 9 can be renewed in a flowing direction by the raised pieces 12 to raise a heat transfer rate, improving a heat exchange property.

The raised pieces 12 can be formed from a shape holding plate 9 in a flat shape by slit forming or louvering. Since there is no need for another member to manufacture a shape holding plate 9 with raised pieces 12, no additional material cost is required. A shape holding plate with raised pieces can be produced from a shape holding plate which is in a flat shape in the same as the shape holding plate shown in FIG. 1. An inexpensive type of shape holding plate which can be produced at a low cost because of no need for slit forming, and a high grade type of shape holding plate which has the raised pieces 12 formed thereon can be made from the same shape of materials, and cost reduction can be established by mass production. The fourth embodiment is the same as the first embodiment in terms of other entire structure and advantages.

Embodiment 5

Figure 8:
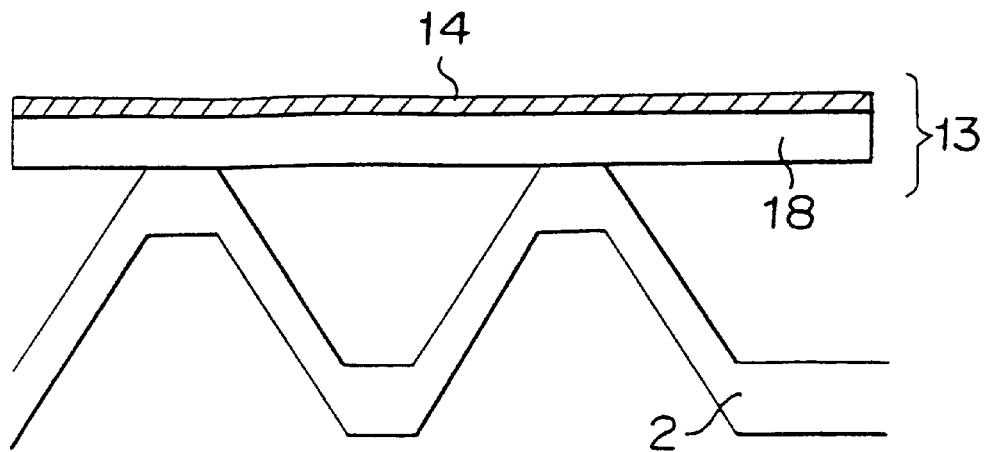
FIG. 8 is a sectional view showing a part of a shape holding plate of the opposed flow total heat exchanger according to a fifth embodiment of the present invention.

In FIG. 8, there is shown a schematic view of a shape holding plate of the heat exchanger according to another embodiment. In this Figure, like or corresponding parts are indicated by the same reference numerals as the parts of the first embodiment, and explanation of those parts will be omitted. Reference numeral 13 designates the shape holding plate which is mounted in the total heat exchanger in the same arrangement as the heat exchanger shown in FIG. 1, and which is constituted by an aluminum laminated sheet formed by laminating aluminum foil 14 to a paper sheet 18.

The shape holding plate 13 which contacts with a corrugated portion 3 of a partition 2 works as a fin in terms of heat exchange as explained with reference to first embodiment. Use of the aluminum foil 14 having good thermal conduction can improve the fin effect to raise a heat exchange property. Since the paper sheet 18 is stronger than the aluminum foil in terms of strength, the shape holding function which is provided to the heat exchanger 1 by the shape holding plates can be maintained at a higher level in comparison with a case wherein the shape holding plates are made of only aluminum foil. The fifth embodiment is the same as the first embodiment in terms of other entire structure and advantages.

Embodiment 6

Figure 9:
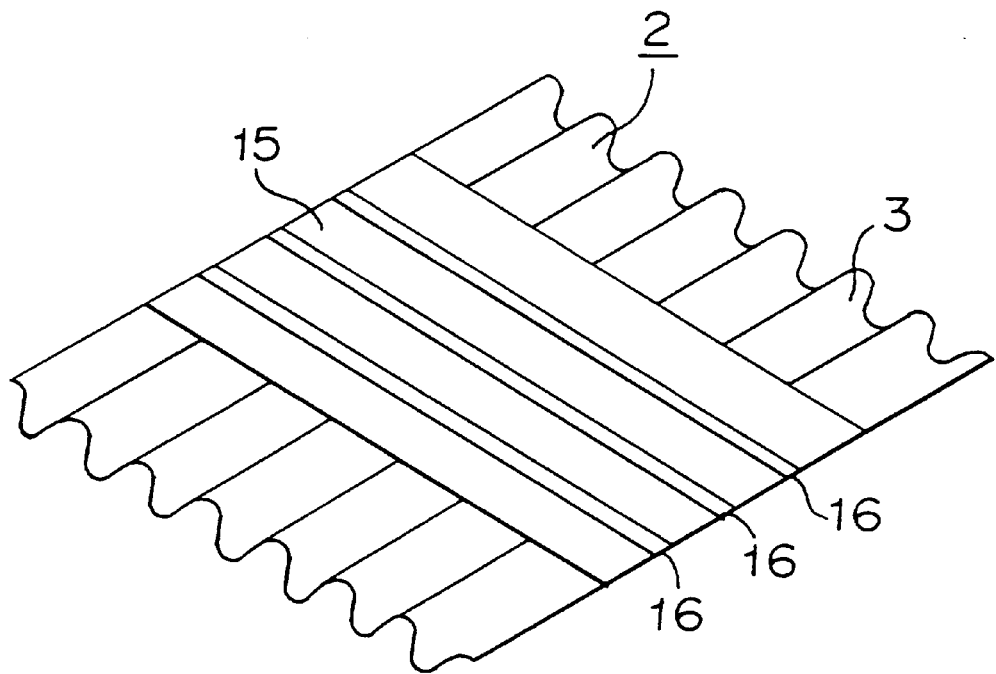
FIG. 9 is a schematic perspective view showing a shape holding plate of the opposed flow total heat exchanger according to a sixth embodiment of the present invention.

In FIG. 9, there is shown a schematic perspective view of the shape holding plate according to another embodiment, wherein an aluminum laminated paper sheet similar to the paper sheet shown in FIG. 8 is used. In FIG. 9, like or corresponding parts are indicated by the same reference numerals as the parts of the fifth embodiment, and explanation of those parts will be omitted. Reference numeral 15 designates the shape holding plate which uses the aluminum laminated paper sheet, and reference numeral 16 designates is slits which formed on the aluminum laminated paper sheet. The slits 16 are formed in a direction perpendicular to the direction of the passages.

Figure 10:
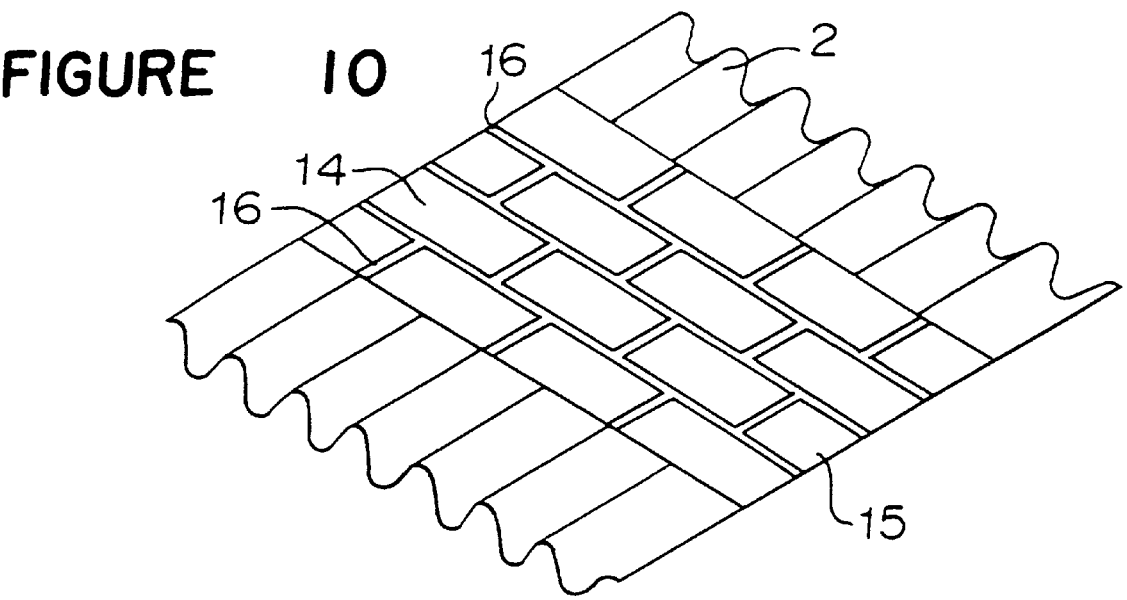
FIG. 10 is a schematic perspective view showing another shape holding plate of the opposed flow total heat exchanger according to the sixth embodiment of the present invention.

In FIG. 10, there is shown a schematic perspective view of another example of the shape holding plate according to the present invention. Reference numeral 16 designates slits which are formed by arranging aluminum foil pieces 14 in a zigzag pattern at predetermined interval on the paper sheet 18. The slits 16 are formed in a direction perpendicular to the direction of the passages, and the slits are formed in the direction of the passages as well at predetermined intervals. The examples shown in FIGS. 9 and 10 are the same as the fifth embodiment in terms of other entire structure and advantages.

The presence of the slits 16 can make the move of heat in the shape holding plate 15 in a flowing direction difficult to improve a heat exchange property. When the heat exchanger is of a crossflow type, passages for supply air and the passages for exhaust air cross at an angle. For this reason, the slits 16 are arranged to be directed at an angle which is intermediate between the angles of both passages. In this case, although the slits offer equal effects to both passages so as to make the move of heat in the flowing directions difficult, there is some amount of move of the heat because the directions of the passages are not perpendicular to the directions of the slits. When the heat exchanger is of an opposed flow type as shown in FIGS. 9 and 10, it is possible to restrain the move of heat in the flowing directions effectively because the directions of the passages are perpendicular to the directions of the slits.

Embodiment 7

Figure 11:
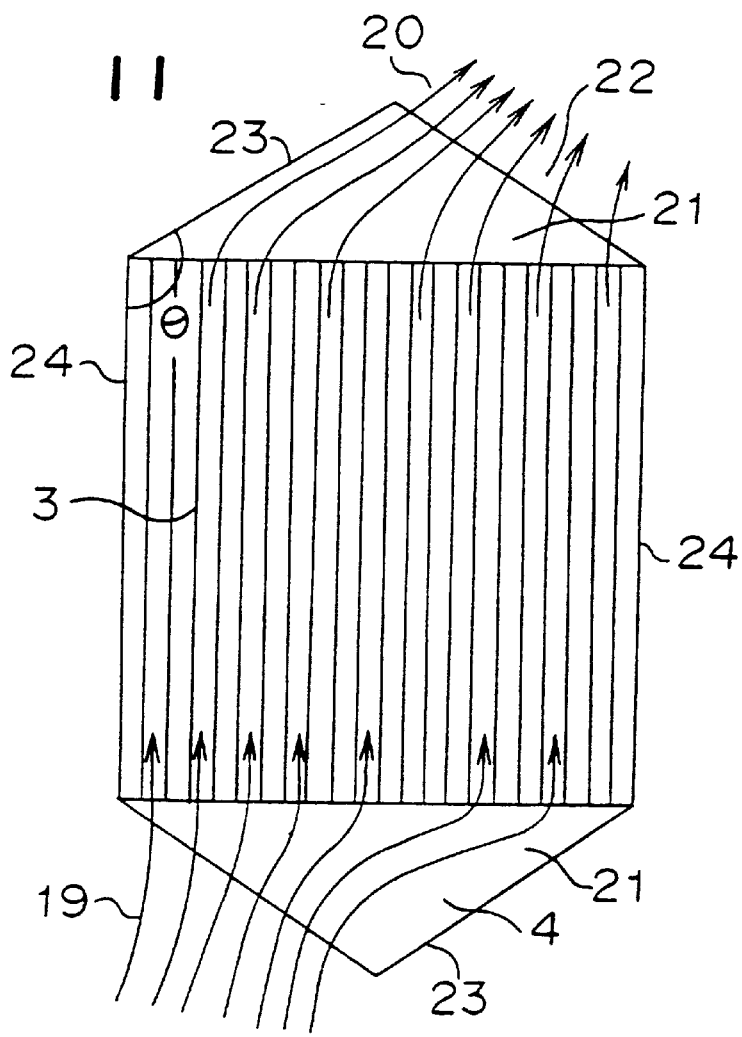
FIG. 11 is a schematic plan view showing a partition of the opposed flow total heat exchanger according to a seventh embodiment of the present invention.

In FIG. 11, there is shown a schematic view of the opposed flow heat exchanger according to another embodiment of the present invention. In this Figure, like or corresponding parts are indicated by the same reference numerals as the parts of the first embodiment, and explanation of those parts will be omitted. A corrugated portion 3 which carries out total heat exchange has opposed ends formed with flat portions 4. One of the flat portions works as a header 21 for distributing inlet air 19, and the other is worked as a header 21 for collecting and diffusing outlet air 20.

Each of the headers 21 has an end formed with an open end 22 for the inlet air 19 or the outlet air 20, and a closed end 23 for separating the air in the heat exchange 1 from air outside the heat exchanger. Each closed end 23 is placed at an angle θ from a side closing portion 24 of the corrugated portion 3 which is adjacent to the closed end. In the embodiment shown, the angle is 120°. Each header 21 is formed in a triangular shape wherein three sides are constituted by each closed end 23, each open end 22 and a connected portion between each flat portion 4 and the corrugated portion 3.

At a side where air flows out from the corrugated portion 3 as an opposed flow portion through the header 21, drifting of an air flow is created in the header 21 to produce a rapid flow region at the side of the closed end 23. The air flow speed at the open end 22 of the header 21 is also large at a position near to the closed end 23. The air flows out in such a manner to unevenly spread in a width direction of the passage, and a contracted vein is created when the air flows out. On the other hand, at a side where air flows into the corrugated portion 3 from the other header 21, exfoliation of an air flow and the resultant drifting of an air flow are created at the side of the closed end 23, and the air flow flows into the corrugated portion 3 at an angle. At that time, the air flow is forced to change its direction, causing pressure loss.

Figure 12:
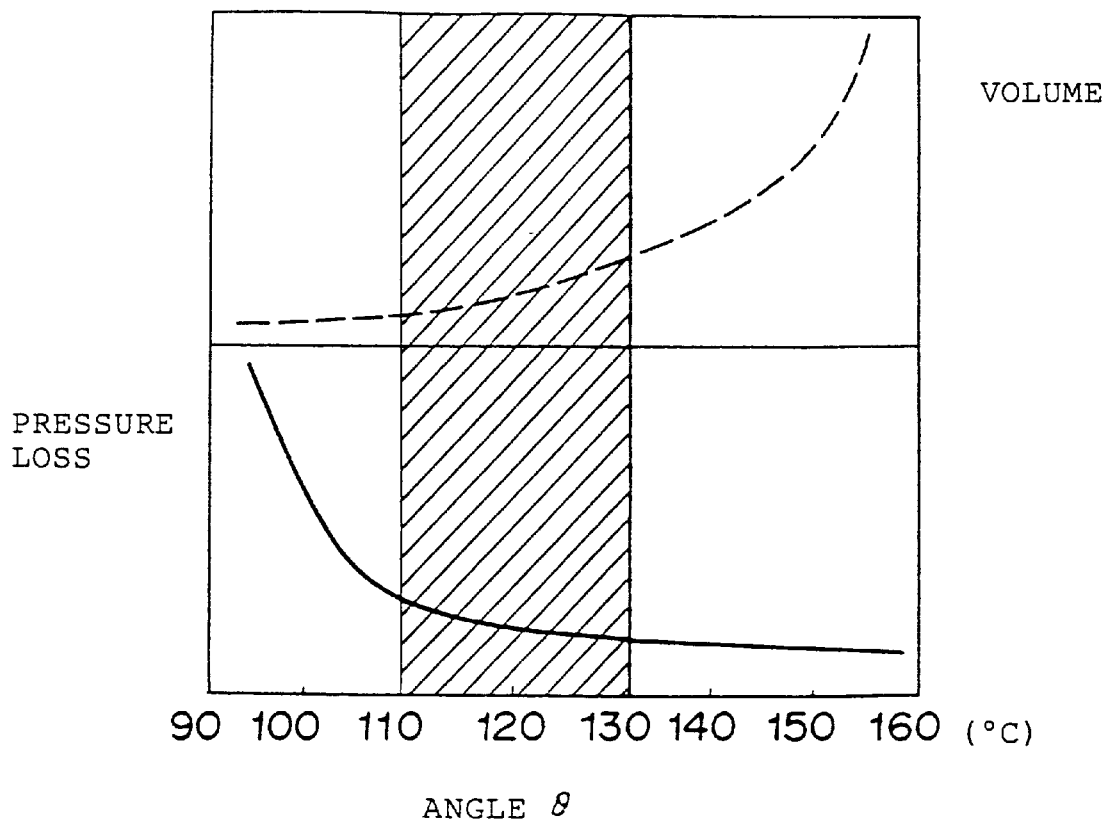
FIG. 12 is a graph showing a relationship among an angle of a header, pressure loss and the volume of a product.

Since the pressure loss has a tendency that the smaller the angle θ between the closed end 23 and the side closing portion 24 of the corrugated portion 3 is, the larger the pressure loss becomes. In order to reduce the pressure loss, the angle θ is required to be large. However, an increase in the angle creates an increase in the volume of the header 21, leading to enlargement of a product. A dependency of the pressure loss and the volume of a product with respect to an angle θ is shown in FIG. 12 wherein the horizontal axis indicates an angle θ. As seen from this Figure, the angle of the header is preferably to be 110°–130°. By the arrangement shown in FIG. 11, the pressure loss can be reduced without enlarging the volume of a product.

Figure 11A:
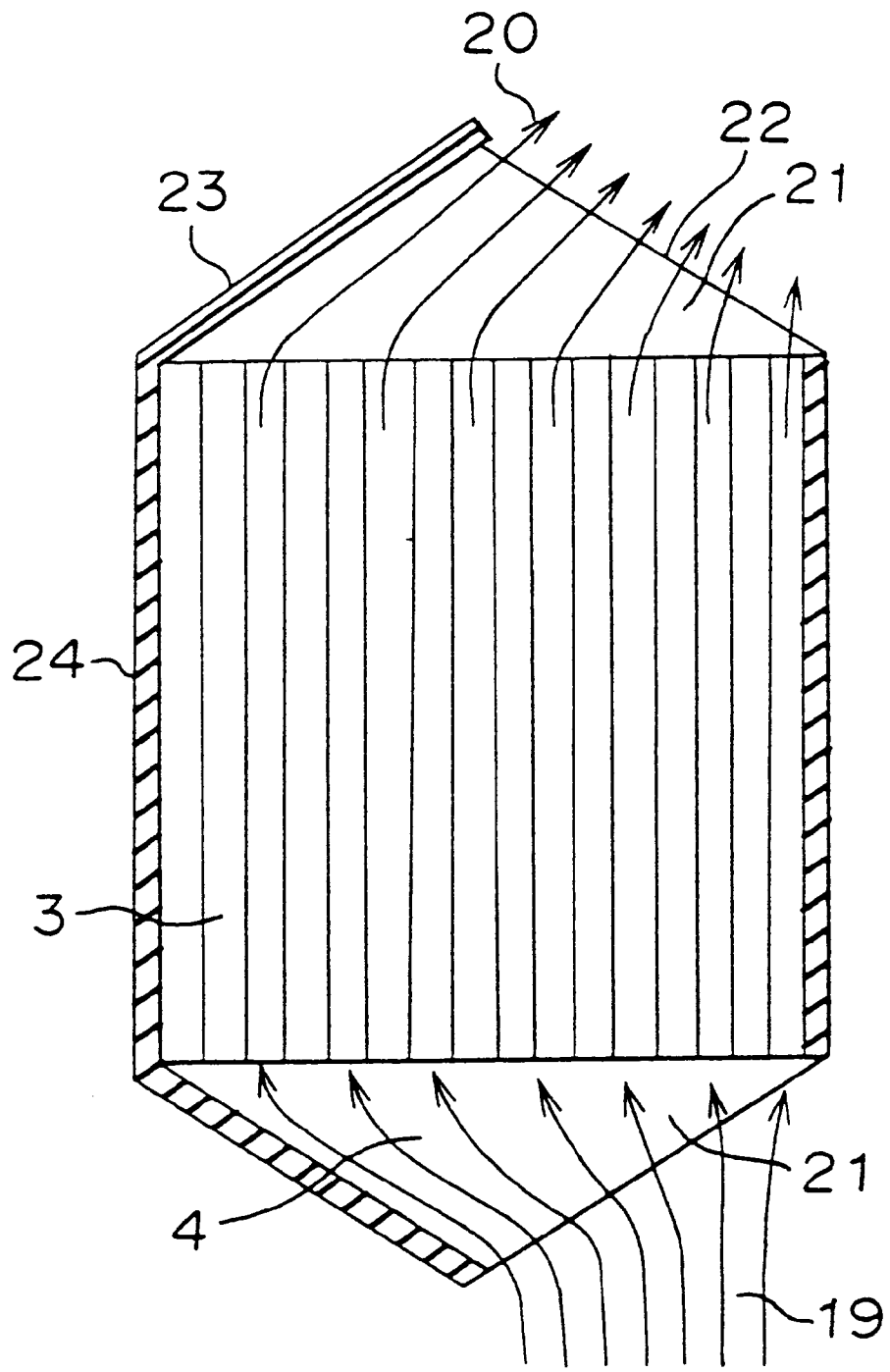
FIG. 11A is a schematic plan view showing a modified partition according to the seventh embodiment of the present invention.

Although in FIG. 11, it is shown that the air flow 19 which has flowed in at the lower left flows out as the outlet air 20 at the upper right, the inlet and outlet of the air is not limited to such arrangement. The air may flow out as the outlet air 20 at the upper right after the air 19 flowing in at the lower right has passed through the corrugated portion 3 as shown in FIG. 11A. The passages in the corrugated portion 3 can be shortened by carrying out inlet and outlet of the air at the same direction as shown in FIG. 11A, providing a heat exchanger with pressure loss reduced.

Embodiment 8

Figure 13:
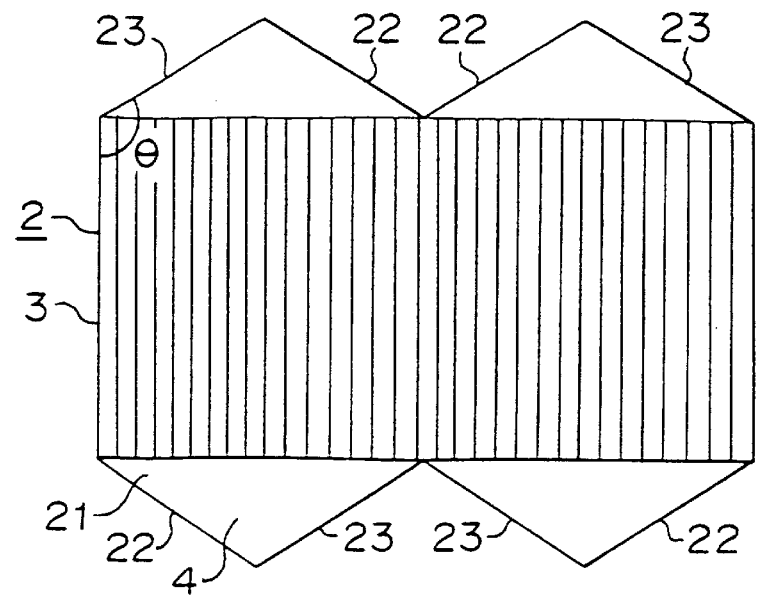
FIG. 13 is a schematic plan view showing a partition of the opposed flow total heat exchanger according to an eighth embodiment of the present invention.
Figure 13:
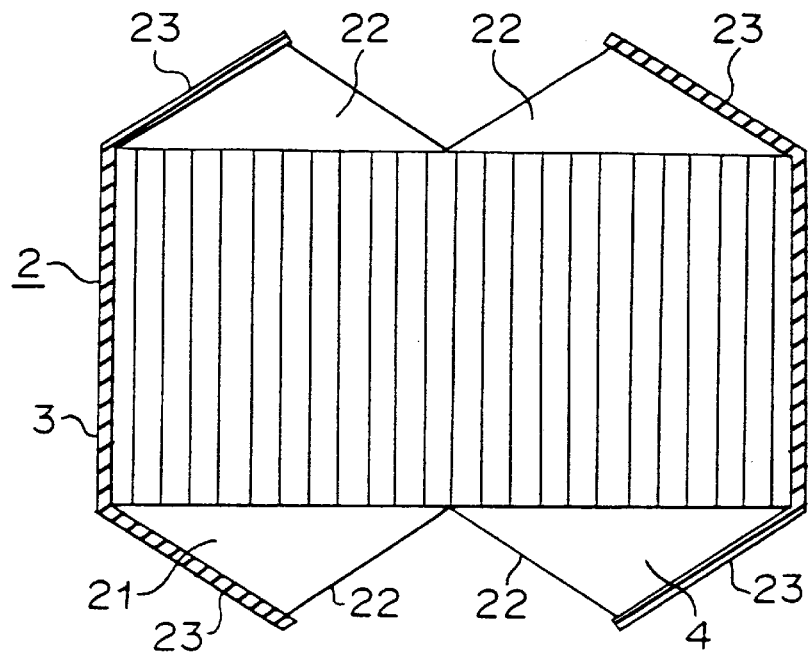
Figure 13:
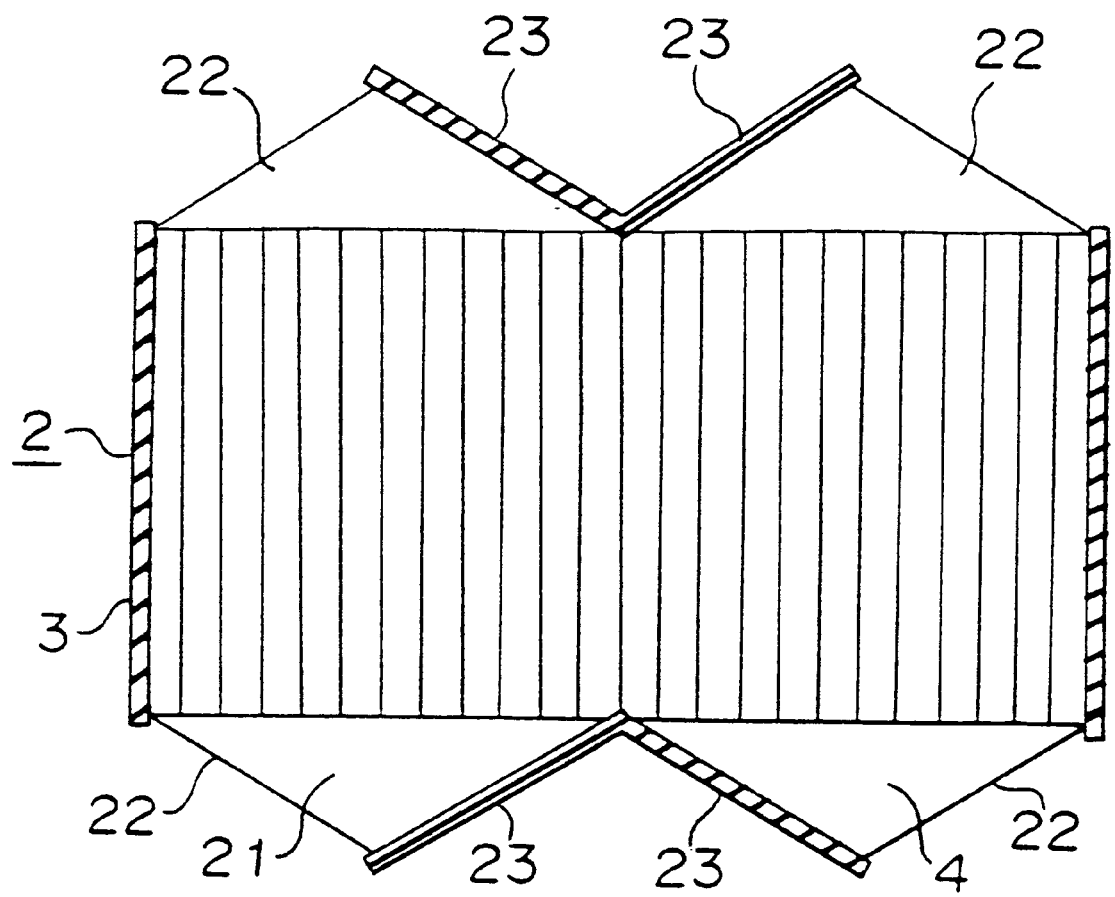

In FIG. 13, there is shown a schematic plan view of a partition of the opposed flow heat exchanger according to another embodiment of the present invention. In this Figure, like or corresponding parts are indicated by the same reference numerals as the parts of the first embodiment, and explanation of those parts will be omitted. Totally four headers 21 which are provided at flat portions 4 continuous to a corrugated portion 3 and are formed in a triangular shape are arranged so that two of them are placed at one of the opposite ends of the corrugated portion 3 for inlet and the remaining two are placed at the other end of the corrugated portion for outlet.

According to the embodiment, the volume occupied by the headers can be reduced without changing the angle θ for the headers in comparison with a case wherein totally two headers are provided as shown in FIG. 11. Although in this embodiment the number of the headers is four, a similar effect can be offered if the number of the headers is e.g. six or eight beyond four. This embodiment is the same as the first embodiment in terms of other entire structure and advantage.

Although in the arrangement shown in FIG. 13 closed ends 23 are placed at a central portion of the paired headers 21 below the corrugated portion 3 and closed ends 23 are placed at outer portions of the paired headers 21 above the corrugated portion 3, the arrangement of the headers are not limited to the one shown in FIG. 13. For example, it is acceptable to take the arrangement shown in FIG. 13A wherein the closed ends 23 are placed at outer portions of the lower headers 21, open ends 22 are placed at the central portion of the paired lower headers, the closed ends 23 are placed at the outer portions of the upper headers and open ends 22 are placed at a central portion of the paired upper headers. It is also acceptable to take the arrangement shown in FIG. 13B wherein the open ends 22 are placed at the outer portions of the lower headers, the closed ends 23 are placed at the central portion of the paired lower headers, the open ends 22 are placed at the outer portions of the upper headers, and the closed ends 23 are placed at the central portion of the paired upper headers. When the open ends 22 above and below the corrugated portion are aligned as shown in FIGS. 13A and 13B, the passages in the corrugated portion 3 can be shortened, providing a heat exchanger with pressure loss reduced.

Embodiment 9

Figure 14:
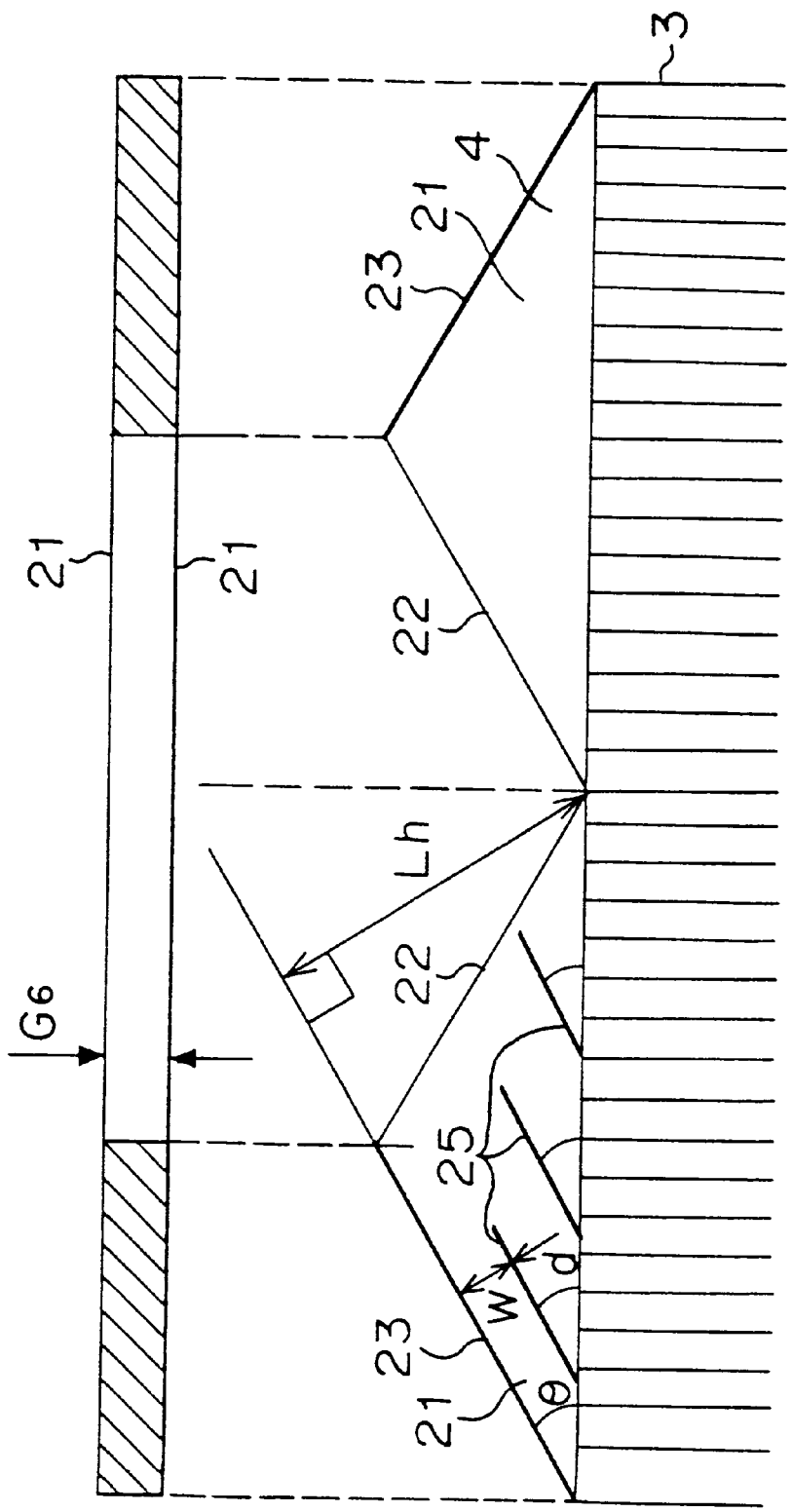
FIG. 14 is a schematic plane view showing a partition of the opposed flow total heat exchanger according to a ninth embodiment of the present invention.

In FIG. 14, there is shown a schematic plan view of a partition of the opposed flow heat exchanger according to another embodiment of the present invention. In this Figure, like or corresponding parts are indicated by the same reference numerals as the parts of the eighth embodiment, and explanation of those parts will be omitted. Reference numeral 25 designates partition walls as flow dividing plates which are provided in parallel on a header 21 defined by a flat portion 4. When the number of the partition walls 25 per a header is defined as N and the thickness of the partition walls 25 is defined as d, the product, N×d, is set to be not larger than one-tenth of the opening width Lh of an open end 22 of the header 21.

The intervals W for arrangement of the partition walls 25 are set to be not less than five times the intervals G6 for headers 21 in a layering direction. The provision of the partition walls 25 in the headers 21 can avoid drifting of the air flow referred to with respect to the seventh embodiment, offering an advantage in that pressure loss is reduced. By setting the product, N×d, of the number N and the thickness d of the partition walls to not higher than one-tenth of Lh, a decrease in the cross-sectional area of the passages in the headers 21 by the partition walls 25 can be restrained, offering an advantage in that the pressure loss reducing effect by the provision of the partition walls can be sufficiently attained.

By setting the intervals W for arrangement of the partition walls 25 to not less than five times the intervals G6 for the headers in a layering direction, a change in an equivalent diameter in the headers 21 can be restrained within a range of 10%, offering an advantage in that an increase in friction loss caused in the headers 21 can be negligible. This embodiment is the same as the first and eighth embodiment in terms of other entire structure and advantages.

Although the ceiling mounted and concealed total heat exchanging device as shown in FIG. 3 has been referred to as an application of the heat exchanger according to the present invention with respect to the respective embodiments, the heat exchanger according to the present invention is not limited to the ceiling mounted and concealed total heat exchanging device. For example, the heat exchanger according to the present invention is applicable to a cassette type total heat exchanging device 40 shown in FIG. 15. In this case, the opposed flow total heat exchanger 1 according to the first to ninth embodiments of the present invention can be arranged at a central portion of the cassette type total heat exchanging device 40 to offer advantages similar to the embodiments stated earlier. When the length of the passages in opposed flows is shortened with respect to the width of the opposed flow portion, the height of a product can be lowered, providing flexible arrangement of the product to a ceiling.

Figure 15:
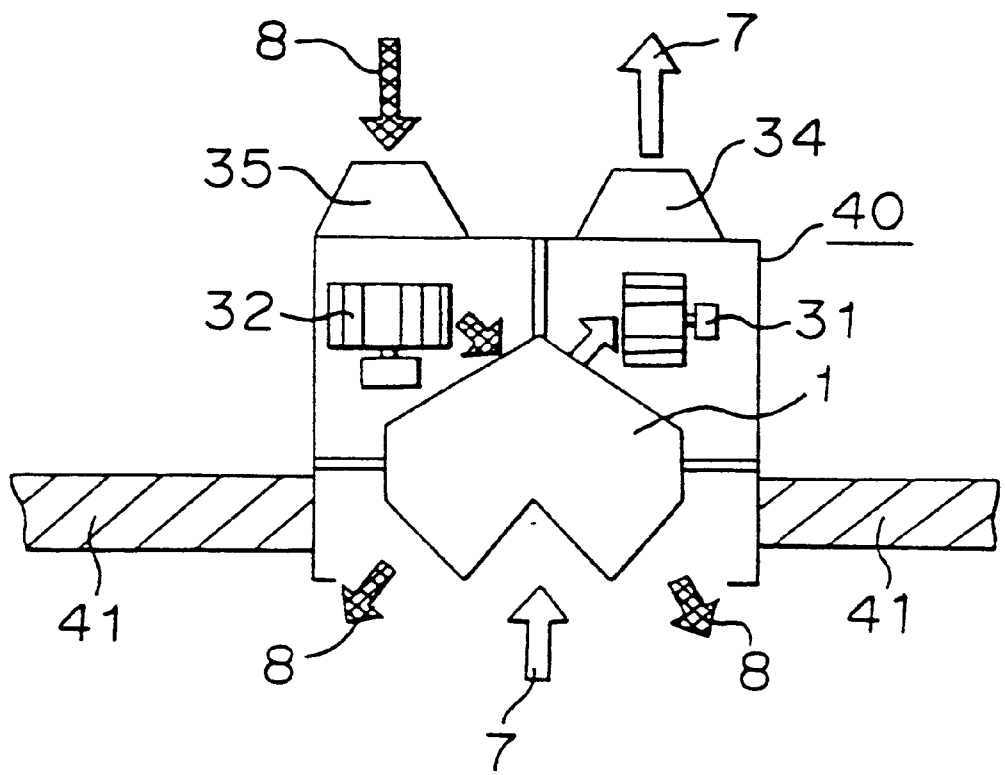
FIG. 15 is a schematic sectional view showing a cassette type total heat exchanging unit with an opposed flow total heat exchanger according to the present invention incorporated thereinto.

The opposed flow total heat exchanger 1 shown in FIG. 15 has an indoor side formed with two headers so that exhaust air 7 flows into a central front portion of the heat exchanger 1 and supply air 8 flows out of side front portions of the heat exchanger. The total heat exchanger 1 has a portion above a ceiling 41 provided with a single header 21 so that the flow of the exhaust air 7 into an air discharging fan 31 and the flow of the supply air 8 into an air supplying fan 32 can be made smoothly.

Figure 16:
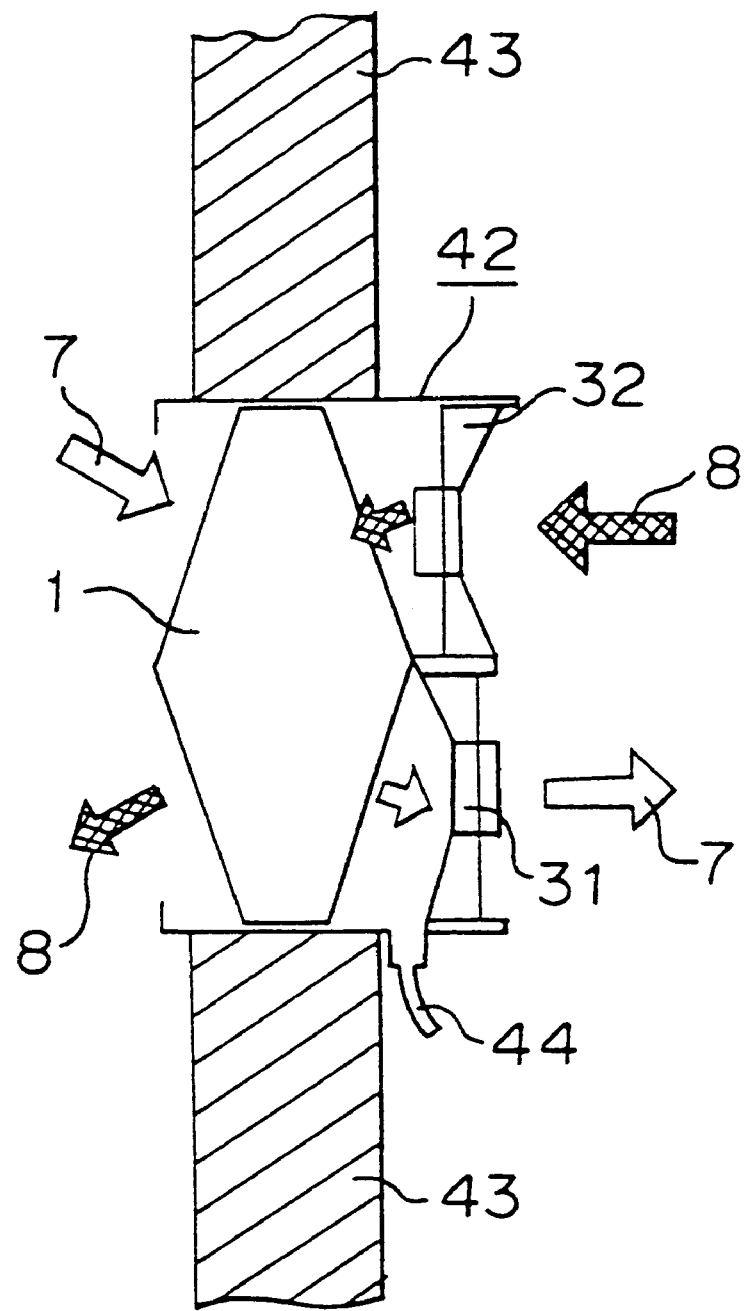
FIG. 16 is a schematic sectional view showing a home heat exchanging unit with an opposed flow total heat exchanger according to the present invention incorporated thereinto.

Also with respect to a home heat exchanging device shown in FIG. 16, the provision of the opposed flow total heat exchanger 1 at a central portion in the home heat exchanging device 42 allows a product to have a thickness near to the thickness of a wall 43, providing a slim type heat exchanging device. In this case, an air discharging fan 31 and an air supplying fan 32 can be arranged at an outdoor side to minimize noise at an indoor side. Although how to flow exhaust air 7 and supply air 8 is not limited to a specific pattern, a line connecting the inlet and outlet for the exhaust air and a line connecting the inlet and the outlet for the supplied air can be crossed in the heat exchanger, expecting improvement in a heat exchange property.

When the outlet for the exhaust air 7 at the outdoor side is placed at a lower portion than a central portion of the product, water of vapor condensation can be easily exhausted if the exhaust air 7 having high humidity is cooled by the supply air 8 in winter to produce vapor condensation. When the product has a lower end provided with a drain 44 as shown in FIG. 16, there is no possibility that the water of vapor condensation stays in the heat exchanging device 42 to deteriorate the performance of the heat exchanging device. The shape holding plates 9 in the opposed flow total heat exchanger 1 can be made from e.g. a high polymer material having a good water holding property. In this case, the water of vapor condensation which has been created in the heat exchanger is once held by the shape holding plates 9, and when the humidity in the exhaust air lowers, the moisture in the shape holding plates is released to eliminate the creation of drainage.

Embodiment 10

Figure 17:
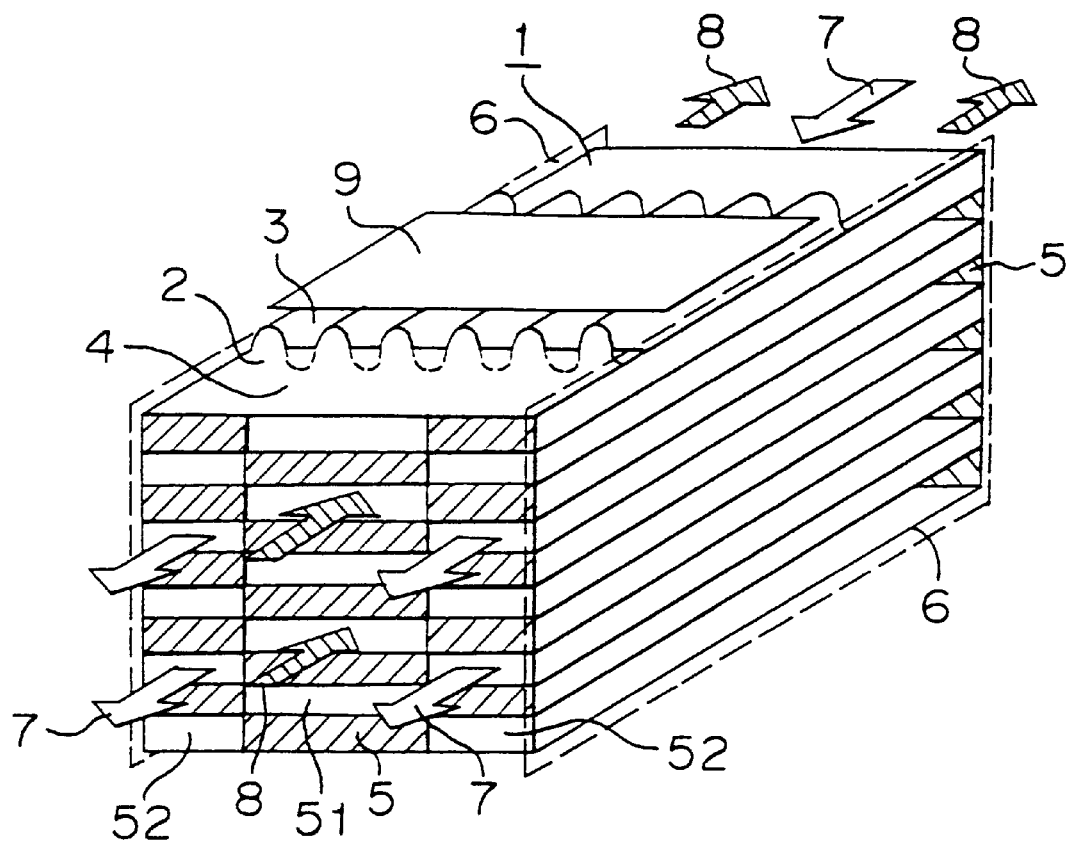
FIG. 17 is a schematic perspective view showing the opposed flow total heat exchanger according to a tenth embodiment of the present invention.

In the first embodiment, the inlets and the outlets of the opposed flow total heat exchanger 1 are arranged at right angles with respect to the direction of the passages in the corrugated portion 3, and the bend of air flows introduces an increase in pressure loss. In FIG. 17, there is shown a schematic perspective view of a heat exchanger wherein the passages can be prevented from bending in order to the problem of the increased pressure loss. In this Figure, like or corresponding parts are indicated by the same reference numerals as the parts of the first embodiment, and explanation of those parts will be omitted.

Reference numeral 51 designates central end openings which are formed at central portions in end surfaces of the corrugated portions 3 of an opposed flow total heat exchanger 1 in the direction of the passages, and reference numeral 52 designates right and left end openings which are made in the end surfaces on the right and left sides of the central portions. The central openings 51, and the right and left openings 52 are alternately formed between adjoining flat portions 4 in the layering direction. The left and side portions of the central openings 51, and the central portions between each pair of the right and left openings 52 are covered by closed ends 5. The central openings 51, and the right and left openings 52 open to different passages. Likewise, the opposed end surfaces of the opposed flow total heat exchanger 1 have similar central end openings 51, and similar right and left end openings 52 formed therein.

As shown in FIG. 17, supply air 8 flows into the central openings 51 at the front side, and exhaust air 7 flows out of the right and left openings 52 at the front side. As seen from this Figure, the end surfaces are divided into the central portions, and the right and left portions, and the respective portions have the openings formed therein to provide supply air passages and exhaust air passages. By such arrangement, the air flows can be prevented from being bent to minimize the pressure loss in the opposed air flow total heat exchanger though the opening area of the openings in the end surfaces is slightly smaller than that in the case of FIG. 1.

Figure 18:
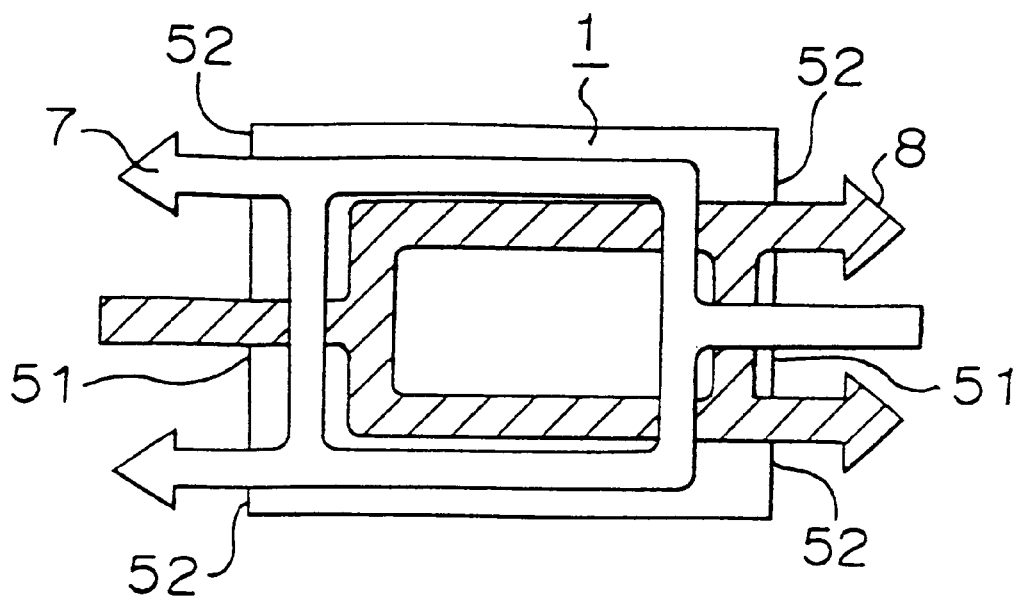
FIG. 18 is a schematic plan view showing a pattern of flows of supply air and exhaust air in the opposed flow total heat exchanger shown in FIG. 17.

In FIG. 18, there is shown a schematic plan view of the flows of the supply air 8 and the exhaust air 7 in the opposed flow total heat exchanger 1 shown in FIG. 17. In FIG. 18, like or corresponding parts are indicated by the same reference numerals as the parts shown in FIG. 17, and explanation of those parts will be omitted. In FIG. 18, the supply air 8 and the exhaust air 7 flow into the total heat exchanger 1 through the central openings 51 at one end of the heat exchanger and the central openings 51 at the other end of the heat exchanger, the supply air and the exhaust air carry out heat exchange in the heat exchanger, and then they flow out of the heat exchanger through the right and left openings 52 of the respective ends of the heat exchanger.

Figure 19:
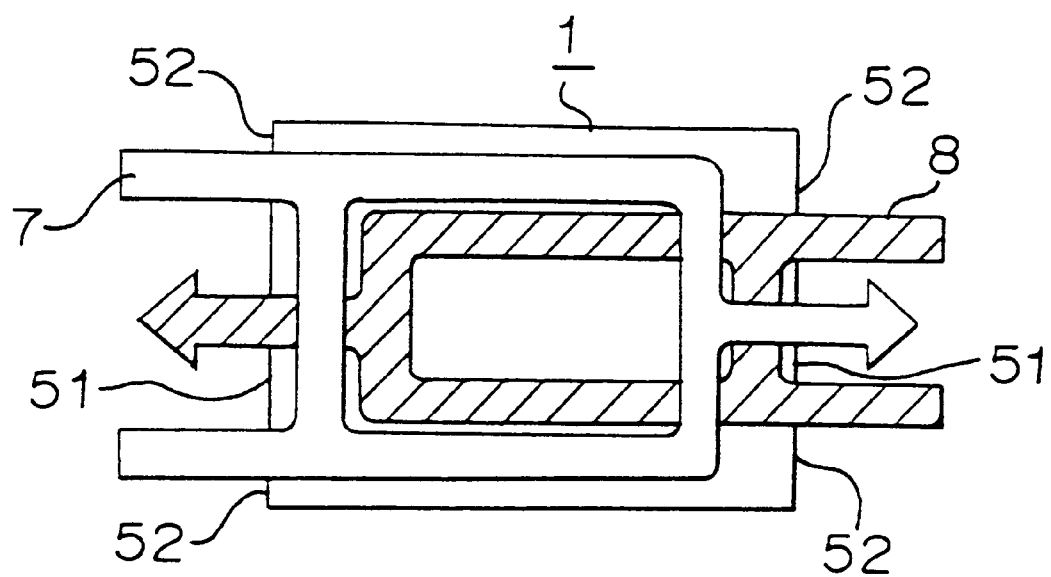
FIG. 19 is a schematic plan view showing another pattern of flows of supply air and exhaust air in the opposed flow total heat exchanger shown in FIG. 17.

How to flow the supply air and the exhaust air in the opposed total heat exchanger 1 is not limited to the pattern shown in FIG. 18. In FIG. 19, there is shown a schematic view of another pattern of the flows of the supply air 8 and the exhaust air 7 in the opposed flow total heat exchanger 1 shown in FIG. 17. In FIG. 19, the supply air 8 and the exhaust air 7 flow into the heat exchanger through the right and left side openings 52 at one end of the heat exchanger and the right and left side openings 52 at the other end of the heat exchanger, respectively, the supply air and the exhaust air carry out heat exchange in the heat exchanger, and then they flow out of the heat exchanger through the central openings 51 at both ends of the heat exchanger.

Figure 20:
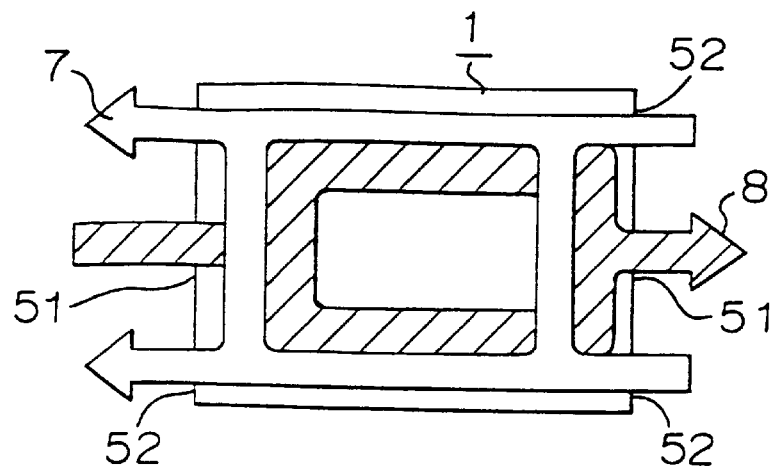
FIG. 20 is a schematic plan view showing another pattern of flows of supply air and exhaust air in the opposed flow total heat exchanger shown in FIG. 17.

In FIG. 20, there is shown a schematic plan view of another pattern of the flows of the supply air 8 and the exhaust air 7 in the opposed flow total heat exchanger 1 shown in FIG. 17. In FIG. 20, the supply air 8 flows into and out of the heat exchanger through the central openings 51 at both ends of the heat exchanger, and the exhaust air 7 flows into and out of the heat exchanger through the right and left side at both ends of the heat exchanger.

As explained, several flowing patterns for the supply air and the exhaust air are included in this embodiment. In any one of several flowing patterns, the opposed flow total heat exchanger can reduce pressure loss because the flowing direction are parallel with the direction of the passages in the corrugated portions 3. This embodiment is not limited to the total heat exchanger, and this embodiment is also applicable to a sensible heat exchanger like the other embodiments. This embodiment may be properly combined with any one of the other embodiments.

Embodiment 11

Figure 21:
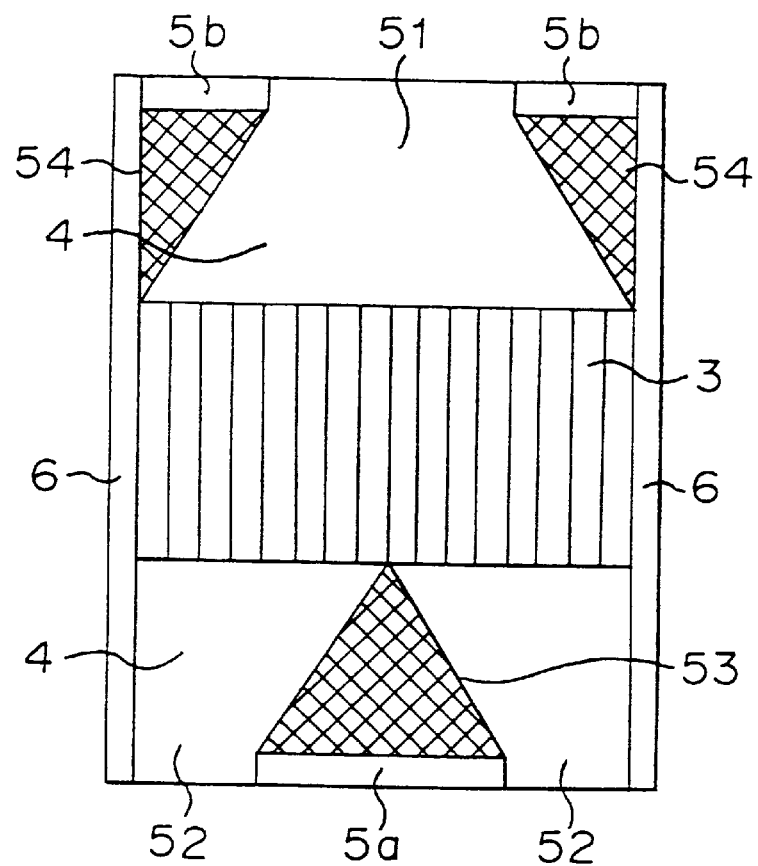
FIG. 21 is a schematic view showing the opposed total heat exchanger according to an eleventh embodiment of the present invention.
Figure 22:
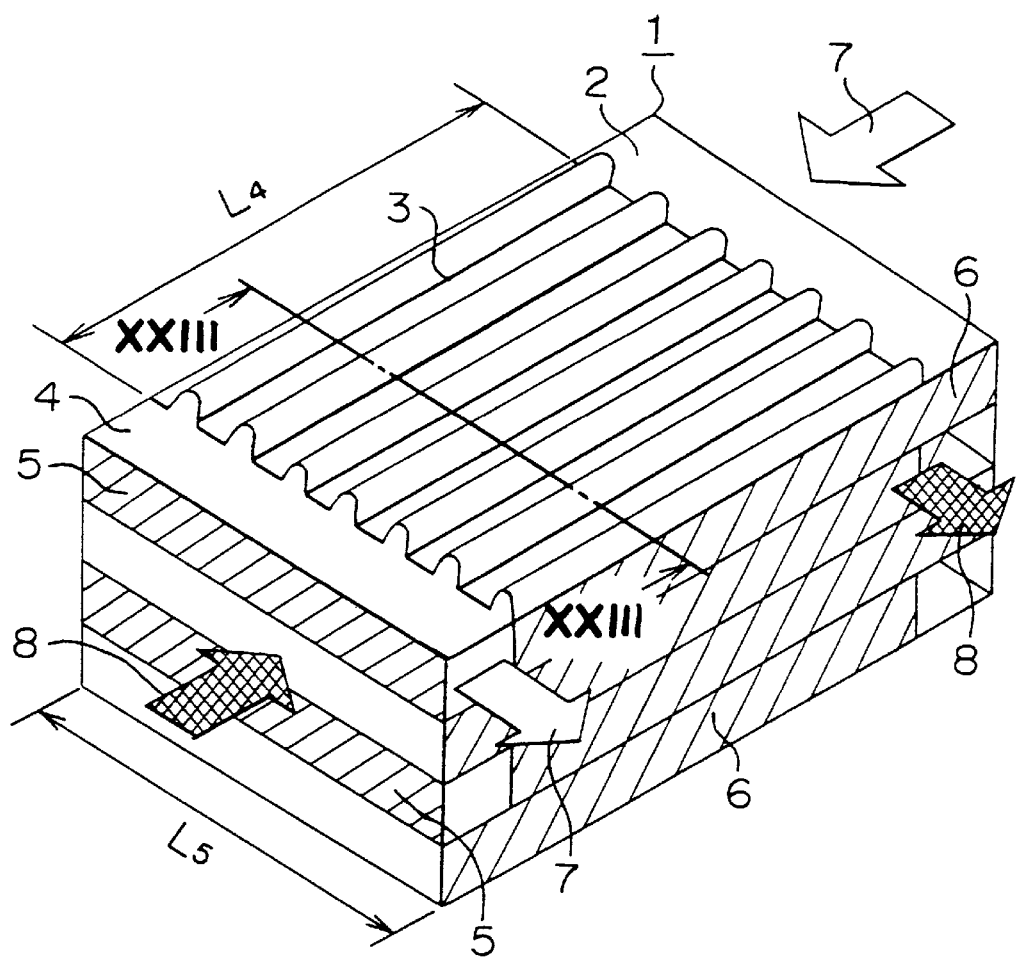
FIG. 22 is a schematic perspective view showing a conventional total heat exchanger.
Figure 23:
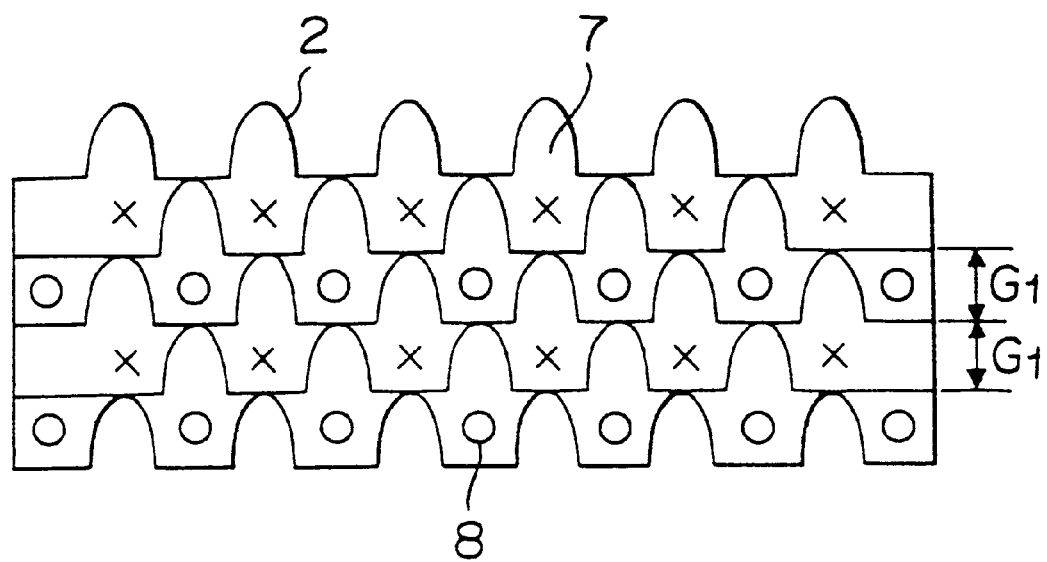
FIG. 23 is a sectional view taken along the line XXIII—XXIII of FIG. 22.
Figure 24:
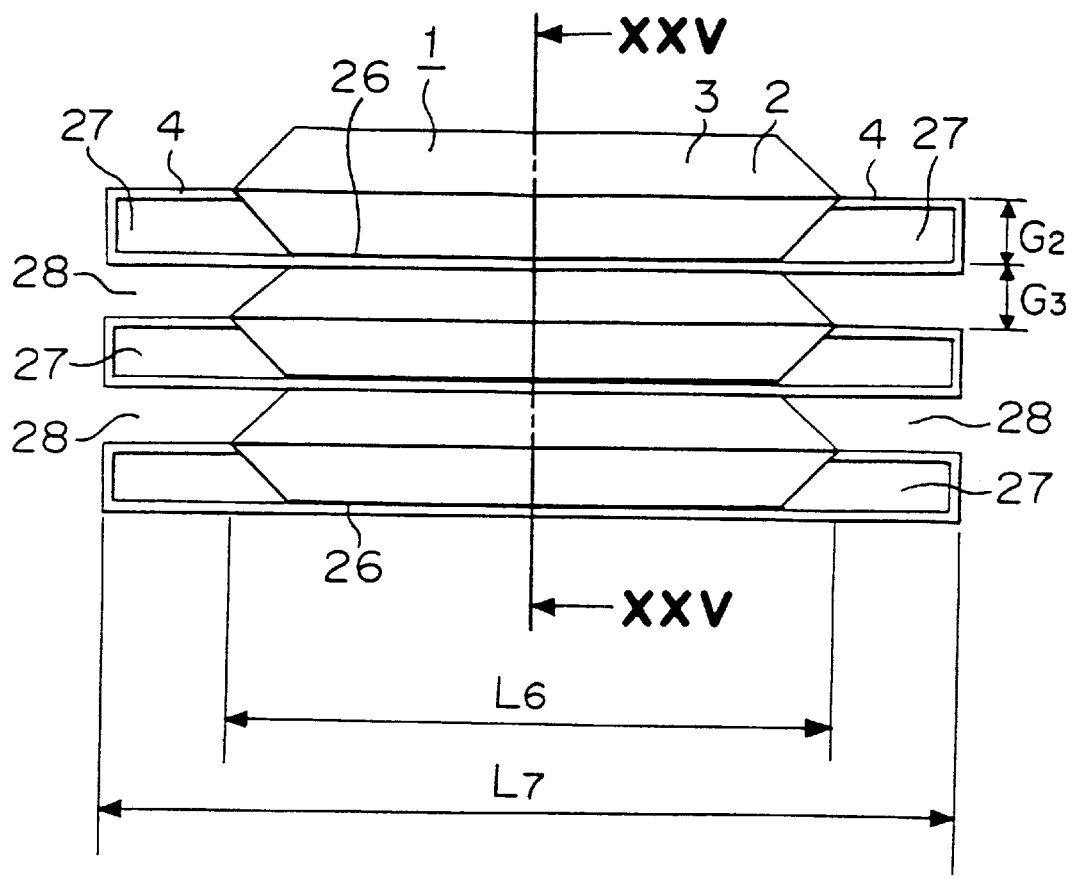
FIG. 24 is a schematic view showing another conventional heat exchanger.
Figure 25:
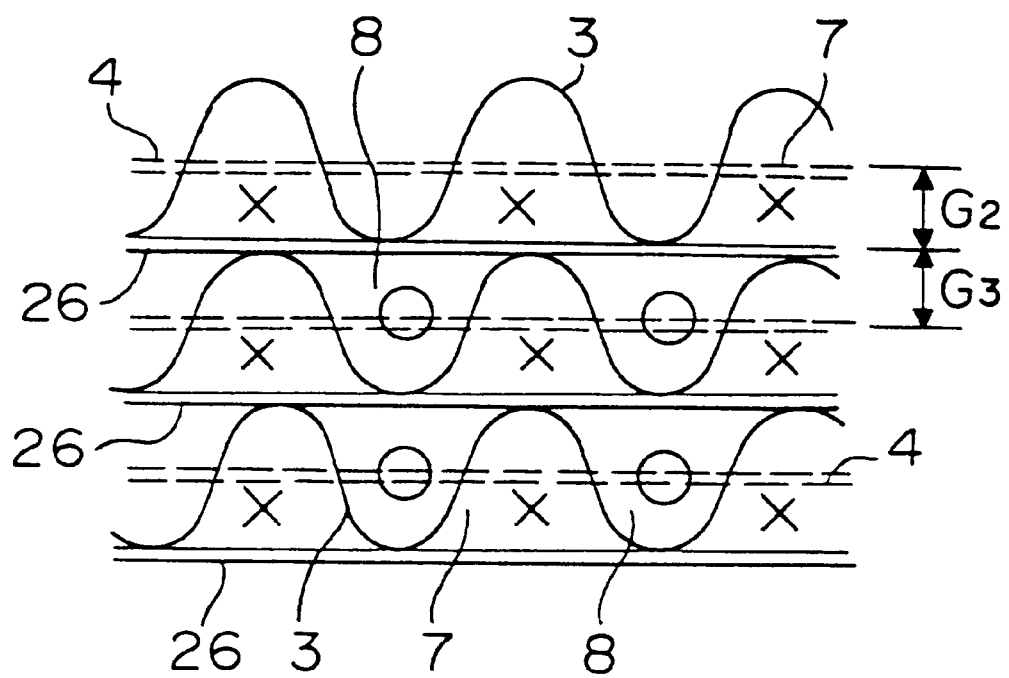
FIG. 25 is a sectional view taken along the line XXV—XXV of FIG. 24.

In FIG. 21, there is shown a schematic view of another example of the opposed flow total heat exchanger 1 constructed according to the tenth embodiment. In FIG. 21, like or corresponding parts are indicated by the same reference numerals as the parts shown in FIG. 17, and explanation of those parts will be omitted. In FIG. 21, reference numeral 53 designates a first spacer which is arranged between a central closed end 5a and a corrugated portion 3 on a flat portion 4, and which is tapered toward the corrugated portion 3. Reference numeral 54 designates second spacers which are arranged between right and left closed ends 5b and the corrugated portion 3 on a flat portion 4, and which are tapered toward the corrugated portion 3.

When an opening is formed in an end surface, pressure loss occurs due to presence of rapid enlargement or rapid contraction in the passage at a flat portion 4. Considering this problem, the spacers 53 and 54 are provided to make the passage between the central opening 51 and the corrugated portion 3 and the passage between right and left side openings 52 and the corrugated portion 3 smoothly expanded or contracted so as to decrease pressure loss at these portions, further reducing the pressure loss in the opposed flow total heat exchanger.

What is claimed is:

1. An opposed flow heat exchanger, comprising:

partitions each including a corrugated portion defining passages in a wavefront direction, and flat portions for taking in or out air flows from a predetermined direction at opposite ends of said corrugated portion in the wavefront direction; and flat shape holding plates having a length in a direction of said passages which is not longer than a length of said corrugated portion of said partitions;

said partitions and said shape holding plates being alternately layered so that said corrugated portion of each said partition contacts respective adjacent shape holding plates, wherein said flat portion of each said partition faces a respective said flat portion of an adjacent said partition, thereby independently forming the passages through said partitions;

wherein opposite ends of said shape holding plates are retracted relative to respective opposite ends of each said corrugated portion in the direction of said passages.

2. An opposed flow heat exchanger according to claim 1, wherein said length of said shape holding plates is uniform along a direction transverse to said passages.

3. An opposed flow heat exchanger, comprising:

partitions each including a corrugated portion defining passages extending in a wavefront direction, and flat portions for taking in or out air flows from a predetermined direction at opposite ends of said corrugated portion in the wavefront direction; and flat shape holding plates having a length in a direction of said passages which is not longer than a length of said corrugated portion of said partitions;

said partitions and said shape holding plates being alternately layered so that said corrugated portion of each said partition contacts respective adjacent shape holding plates, wherein said flat portion of each said partition faces a respective said flat portion of an adjacent said partition, thereby independently forming the passages through said partitions;

wherein said shape holding plates have a surface formed with raised pieces.

4. An opposed flow heat exchanger according to claim 3, wherein said length of said shape holding plates is uniform along a direction transverse to said passages.

* * * * *